United States Patent
Ko et al.

(10) Patent No.: US 11,937,245 B2
(45) Date of Patent: *Mar. 19, 2024

(54) METHOD AND DEVICE FOR PERFORMING LTE SIDELINK TRANSMISSION ON BASIS OF TIMING OFFSET IN NR V2X

(71) Applicant: LG ELECTRONICS INC., Seoul (KR)

(72) Inventors: Woosuk Ko, Seoul (KR); Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,800

(22) Filed: Sep. 7, 2022

(65) Prior Publication Data

US 2023/0007678 A1 Jan. 5, 2023

Related U.S. Application Data

(63) Continuation of application No. 17/678,704, filed on Feb. 23, 2022, now Pat. No. 11,445,535, which is a
(Continued)

(30) Foreign Application Priority Data

Oct. 2, 2019 (KR) .................. 10-2019-0122280

(51) Int. Cl.
*H04W 72/21* (2023.01)
*H04W 72/23* (2023.01)
*H04W 92/18* (2009.01)

(52) U.S. Cl.
CPC ........... *H04W 72/21* (2023.01); *H04W 72/23* (2023.01); *H04W 92/18* (2013.01)

(58) Field of Classification Search
CPC . H04W 72/042; H04W 72/0446; H04W 4/40; H04W 76/14; H04W 92/18;
(Continued)

(56) References Cited

U.S. PATENT DOCUMENTS

2017/0367067 A1* 12/2017 Hwang ................ H04W 76/14
2018/0167126 A1* 6/2018 Wiberg ................ H04L 1/1854
(Continued)

FOREIGN PATENT DOCUMENTS

WO WO-2020197645 A1 * 10/2020 ........ H04W 72/0406
WO WO-2020213986 A1 * 10/2020 ........... H04L 1/0061

OTHER PUBLICATIONS

Samsung, On NR Uu controlling LTE sidelink, R1-1908483, 3GPP TSG RAN WG1 Meeting #98, Prague, Czech Republic, Aug. 17, 2019, see section 2.
(Continued)

*Primary Examiner* — Nathan S Taylor
(74) *Attorney, Agent, or Firm* — BRYAN CAVE LEIGHTON PAISNER LLP

(57) ABSTRACT

According to an embodiment of the present disclosure, a method for performing sidelink communication by a first device is provided. The method may comprise: transmitting, to a base station, UE capability information of the first device; receiving, from the base station, a radio resource control (RRC) parameter based on the UE capability information; and performing Long Term Evolution (LTE) sidelink transmission to a second device, based on first timing offset candidate values related to the LTE sidelink transmission to the second device which are configured based on the RRC parameter, wherein a first timing offset included in the UE capability information is one of the first timing offset candidate values.

20 Claims, 29 Drawing Sheets

Related U.S. Application Data continuation of application No. PCT/KR2020/013172, filed on Sep. 28, 2020.

(60) Provisional application No. 62/910,414, filed on Oct. 3, 2019, provisional application No. 62/910,412, filed on Oct. 3, 2019, provisional application No. 62/932,426, filed on Nov. 7, 2019.

(58) Field of Classification Search
CPC . H04W 16/28; H04W 72/02; H04W 72/0413; H04W 74/0833; H04W 76/27; H04W 80/02; H04W 16/14; H04W 28/26; H04W 52/0229; H04W 52/0235; H04W 72/0406; H04W 72/0453; H04W 72/1263; H04W 72/1278; H04W 74/0808; H04W 76/11; H04W 76/15; H04W 24/08; H04W 24/10; H04W 28/04; H04W 36/0066; H04W 36/08; H04W 4/44; H04W 4/46; H04W 4/70; H04W 48/12; H04W 52/0216; H04W 52/0248; H04W 52/028; H04W 52/262; H04W 56/001; H04W 56/004; H04W 72/00; H04W 72/04; H04W 72/0426; H04W 72/048; H04W 72/085; H04W 72/10; H04W 72/12; H04W 72/1205; H04W 72/1242; H04W 72/1247; H04W 72/1289; H04W 74/008; H04W 74/06; H04W 74/0841; H04W 76/19; H04W 76/23; H04W 76/25; H04W 76/28; H04W 76/36; H04W 8/22; H04W 8/24; H04W 80/08; H04W 84/005; H04W 88/04; H04W 88/06; H04W 74/08; H04W 52/02; H04W 56/00; H04W 72/08; H04W 74/00; H04L 5/0053; H04L 5/0055; H04L 1/1812; H04L 5/0051; H04L 5/0094; H04L 1/1614; H04L 1/1819; H04L 1/1854; H04L 1/1861; H04L 1/1896; H04L 5/001; H04L 5/0044; H04L 5/0048; H04L 5/0057; H04L 5/0092; H04L 1/0061; H04L 1/0063; H04L 1/1607; H04L 1/1664; H04L 1/1822; H04L 1/1825; H04L 1/1887; H04L 1/189; H04L 1/1893; H04L 2001/0092; H04L 27/2602; H04L 27/26025; H04L 27/2607; H04L 5/0007; H04L 5/0023; H04L 5/0042; H04L 5/0078; H04L 5/0091; H04L 5/00; H04L 1/18; H04L 1/00; H04L 1/16; H04L 27/26; H04B 17/318; H04B 7/0695; H04B 1/713; H04B 17/24; H04B 17/26; H04B 17/327; H04B 17/382; H04B 7/0617; H04B 7/0628; H04B 7/06

See application file for complete search history.

(56) References Cited

U.S. PATENT DOCUMENTS

| | | | | |
|---|---|---|---|---|
| 2018/0368142 | A1* | 12/2018 | Liou | H04W 74/0808 |
| 2019/0191437 | A1* | 6/2019 | Kusashima | H04W 72/0453 |
| 2019/0199420 | A1* | 6/2019 | Faxér | H04L 5/0057 |
| 2020/0052856 | A1* | 2/2020 | Jeon | H04L 5/0053 |
| 2020/0100301 | A1* | 3/2020 | Kusashima | H04W 74/06 |
| 2020/0153541 | A1* | 5/2020 | Faxér | H04L 1/1671 |
| 2020/0221429 | A1* | 7/2020 | Li | H04L 5/0053 |
| 2020/0229098 | A1* | 7/2020 | Cheng | H04W 52/0248 |
| 2020/0260309 | A1* | 8/2020 | Sarkis | H04W 16/14 |
| 2020/0267597 | A1* | 8/2020 | Huang | H04W 76/14 |
| 2020/0267700 | A1* | 8/2020 | Hosseini | H04L 1/1812 |
| 2020/0275450 | A1* | 8/2020 | Lee | H04W 72/53 |
| 2020/0288433 | A1* | 9/2020 | Yu | H04L 5/0094 |
| 2020/0336253 | A1* | 10/2020 | He | H04W 4/40 |
| 2020/0383167 | A1* | 12/2020 | Sengupta | H04W 74/0833 |
| 2021/0014893 | A1* | 1/2021 | Park | H04L 5/0057 |
| 2021/0076433 | A1* | 3/2021 | Hou | H04W 56/002 |
| 2021/0195654 | A1* | 6/2021 | Lei | H04L 1/1664 |
| 2021/0250882 | A1* | 8/2021 | Lin | H04W 56/00 |
| 2021/0250913 | A1* | 8/2021 | Ganesan | H04W 76/14 |
| 2022/0007458 | A1* | 1/2022 | Lin | H04W 72/23 |
| 2023/0017519 | A1* | 1/2023 | Lee | H04W 72/23 |

OTHER PUBLICATIONS

LG Electronics, Discussion on NR Uu controlling LTE sidelink, R1-1908908, 3GPP TSG RAN WG1 Meeting #98, Prague, Czech Republic, Aug. 17, 2019, see sections 1-2.

Futurewei, Feature lead summary #3 of AI 7.2.4.7; Support of NR Uu controlling LTE sidelink, R1-1909811, 3GPP TSG RAN WG1 Meeting #98, Prague, Czech Republic, Sep. 3, 2019, see sections 1-3.2.

Lenovo et al, NR Uu controlling LTE sidelink, R1-1908734, 3GPP TSG RAN WG1 Meeting #98, Prague, Czech Republic, Aug. 16, 2019, see sections 1-2.1.

Mediatek Inc., Support of NR-Uu controlling LTE sidelink, R1-1908402, 3GPP TSG RAN WG1 Meeting #98, Prague, Czech Republic, Aug. 17, 2019, see sections 1-3.

* cited by examiner

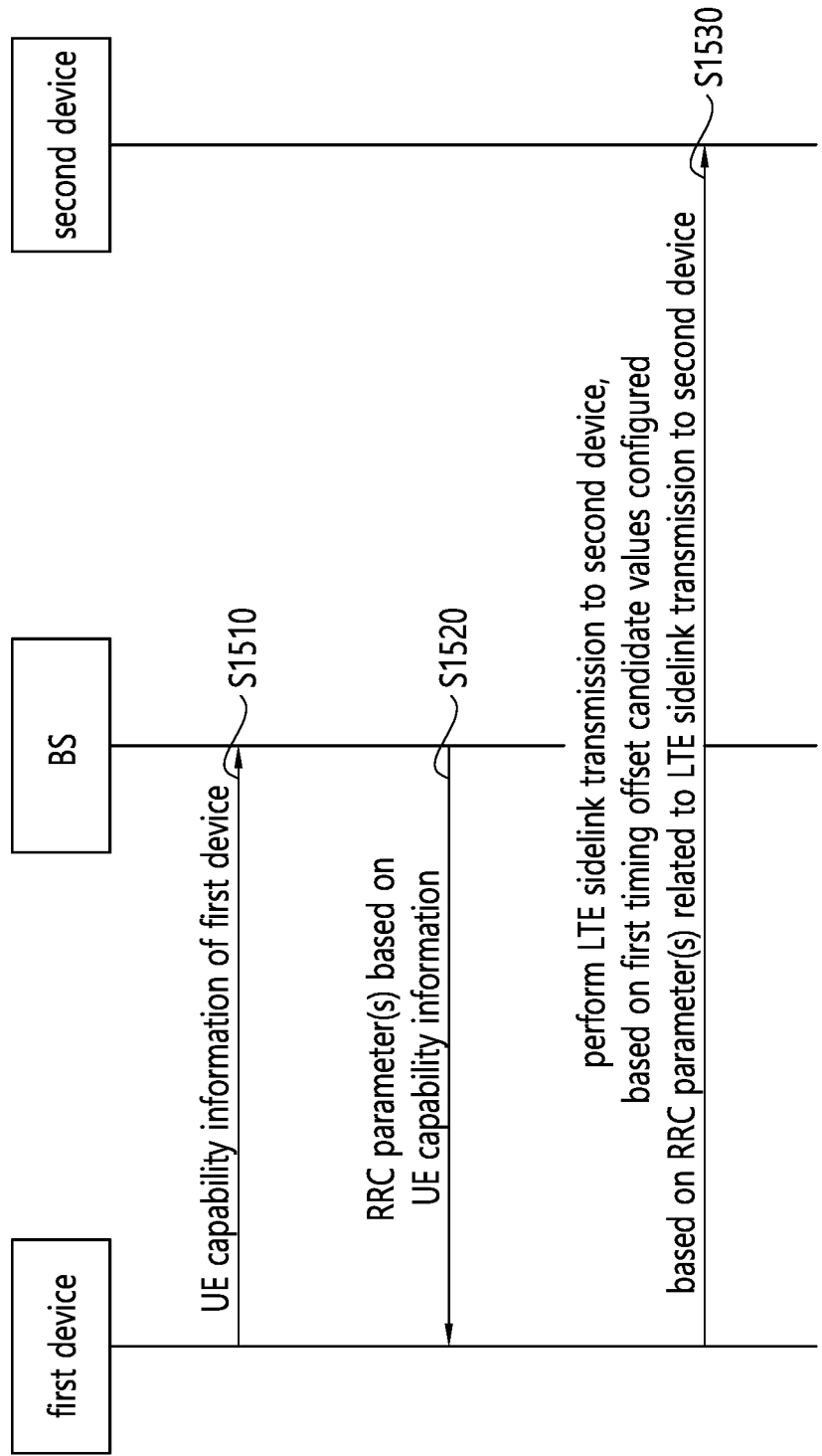

METHOD AND DEVICE FOR PERFORMING LTE SIDELINK TRANSMISSION ON BASIS OF TIMING OFFSET IN NR V2X

This application is a Continuation of U.S. patent application Ser. No. 17/678,704 filed on Feb. 23, 2022, which is a Continuation Bypass of International Application No. PCT/KR2020/013172 filed on Sep. 28, 2020, which claims the benefit of U.S. Provisional Application Nos. 62/910,414 filed on Oct. 3, 2019; 62/910,412 filed on Oct. 3, 2019 and 62/932,426 filed on Nov. 7, 2019 and Korean Patent Application No. 10-2019-0122280 filed on Oct. 2, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for performing LTE sidelink transmission based on a timing offset in NR V2X, and device(s) (or UE(s)) performing the method.

Technical Solutions

Based on an embodiment of the present disclosure, a method for performing sidelink (SL) communication by a first device may be provided. The method may comprise: transmitting, to a base station, UE capability information of the first device; receiving, from the base station, a radio resource control (RRC) parameter based on the UE capability information; and performing Long Term Evolution (LTE) sidelink transmission to a second device, based on first timing offset candidate values related to the LTE sidelink transmission to the second device which are configured based on the RRC parameter, wherein a first timing offset included in the UE capability information is one of the first timing offset candidate values.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: transmit, to a base station, UE capability information of the first device; receive, from the base station, a radio resource control (RRC) parameter based on the UE capability information; and perform Long Term Evolution (LTE) sidelink transmission to a second device, based on first timing offset candidate values related to the LTE sidelink transmission to the second device which are configured based on the RRC parameter, wherein a first timing offset included in the UE capability information is one of the first timing offset candidate values.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: transmit, to a base station, UE capability information of the first UE; receive, from the base station, a radio resource control (RRC) parameter based on the UE capability information; and perform Long Term Evolution (LTE) sidelink transmission to a second UE, based on first timing offset candidate values related to the LTE sidelink transmission to the second UE which are configured based on the RRC parameter, wherein a first timing offset included in the UE capability information is one of the first timing offset candidate values.

Based on an embodiment of the present disclosure, a non-transitory computer-readable storage medium storing instructions may be provided. The instructions, when executed, may cause a first device to: transmit, to a base station, UE capability information of the first device; receive, from the base station, a radio resource control (RRC) parameter based on the UE capability information; and perform Long Term Evolution (LTE) sidelink transmission to a second device, based on first timing offset candidate values related to the LTE sidelink transmission to the second device which are configured based on the RRC parameter, wherein a first timing offset included in the UE capability information is one of the first timing offset candidate values.

Based on an embodiment of the present disclosure, a method for performing wireless communication by a base station may be provided. The method may comprise: receiving, from a first device, UE capability information of the first device; and transmitting, to the first device, a radio resource control (RRC) parameter based on the UE capability information, wherein, based on the RRC parameter, first timing offset candidate values related to Long Term Evolution (LTE) sidelink transmission from the first device to a second device are configured for the first device, and wherein a first timing offset included in the UE capability information is one of the first timing offset candidate values.

Based on an embodiment of the present disclosure, a base station configured to perform wireless communication may be provided. The base station may comprise: at least one memory storing instructions; at least one transceiver; and at least one processor connected to the at least one memory and the at least one transceiver. The at least one processor may execute the instructions to: receive, from a first device, UE capability information of the first device; and transmit, to the first device, a radio resource control (RRC) parameter based on the UE capability information, wherein, based on the RRC parameter, first timing offset candidate values related to Long Term Evolution (LTE) sidelink transmission from the first device to a second device are configured for the first device, and wherein a first timing offset included in the UE capability information is one of the first timing offset candidate values.

Effects of the Disclosure

Based on the present disclosure, V2X communication between devices (or UEs) can be efficiently performed.

BRIEF DESCRIPTION OF THE DRAWINGS

FIG. 15 shows a procedure in which sidelink communication is performed based on wireless communication between a first device, a second device, and a base station, based on an embodiment of the present disclosure.

DESCRIPTION OF EXEMPLARY EMBODIMENTS

Figure 1:
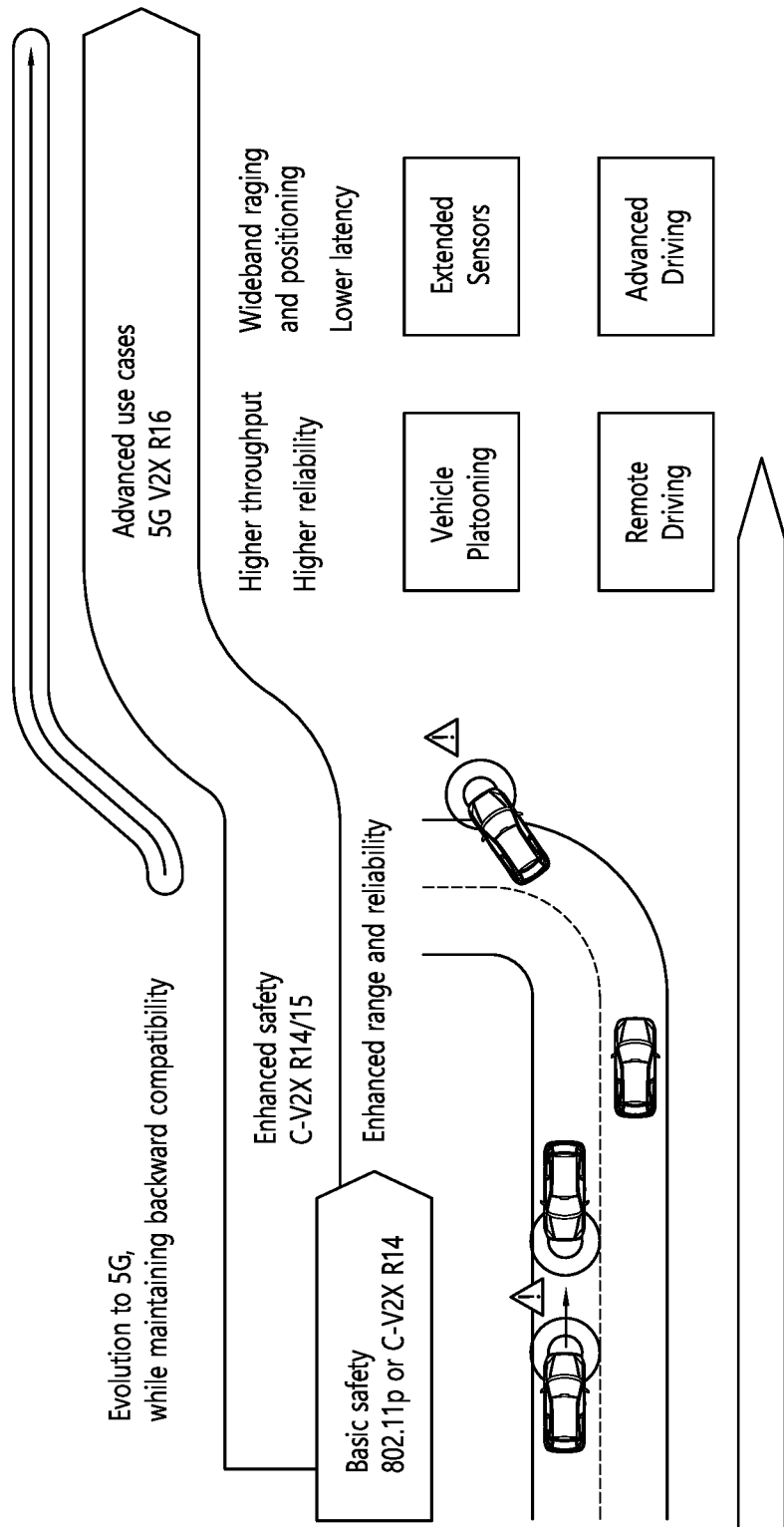
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet radio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
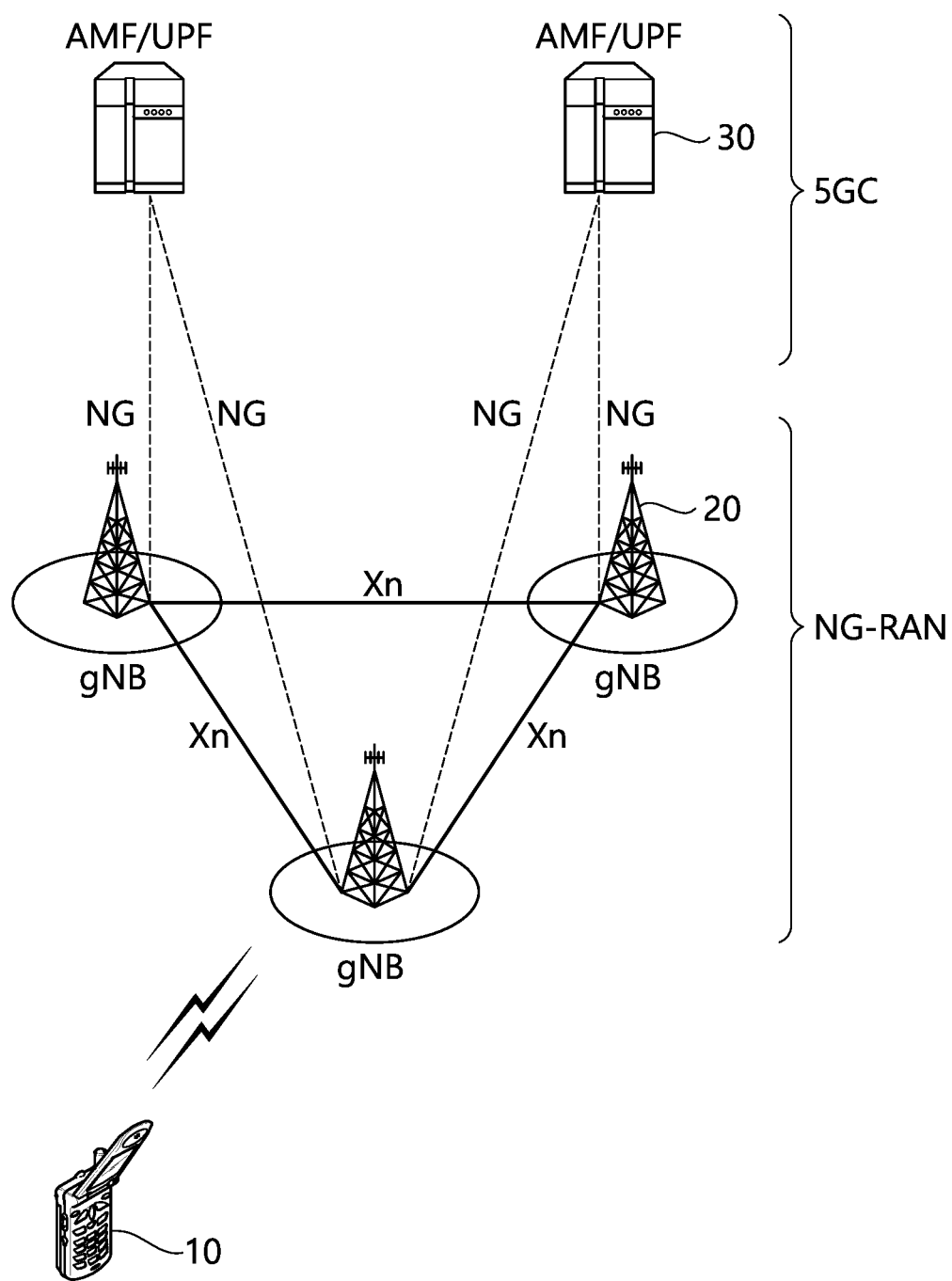
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
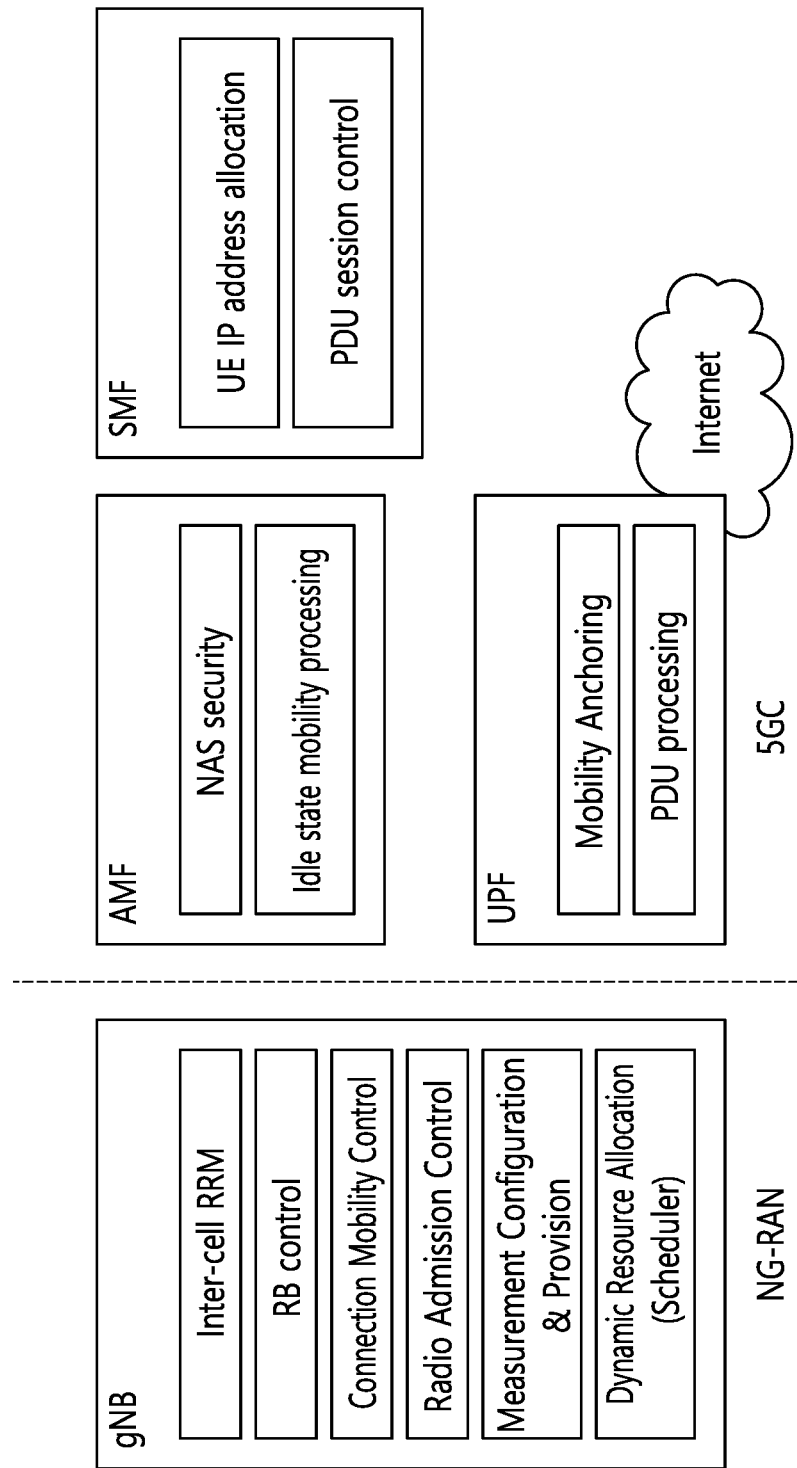
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
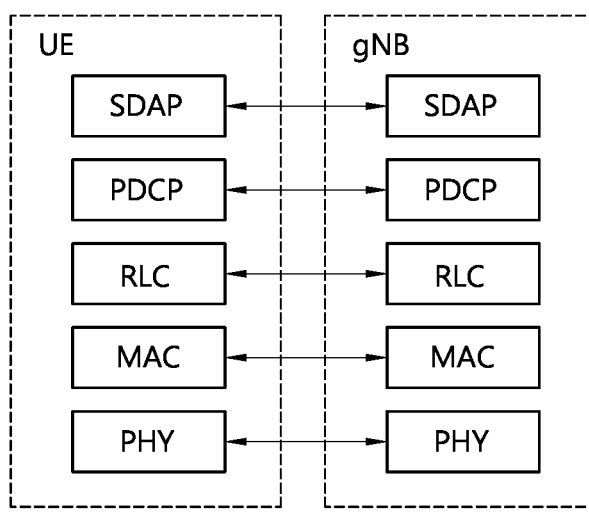
FIGS. 4A and 4B show a radio protocol architecture, based on an embodiment of the present disclosure.
Figure 4B:
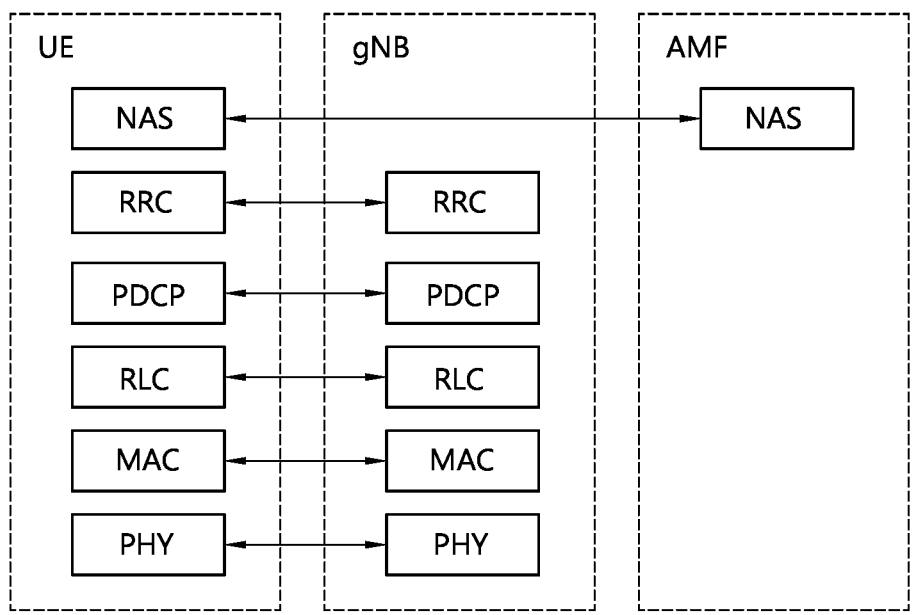

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
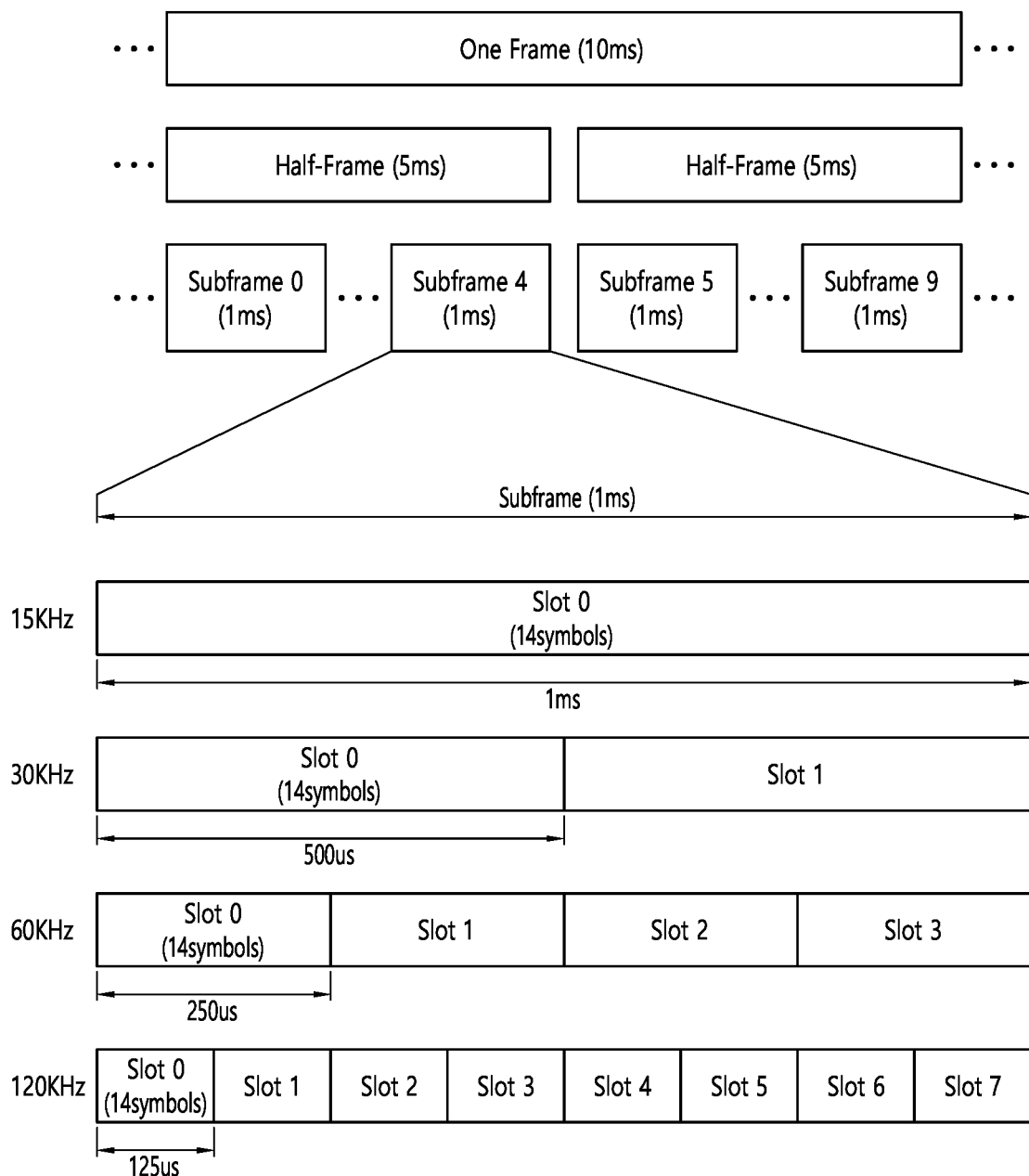
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
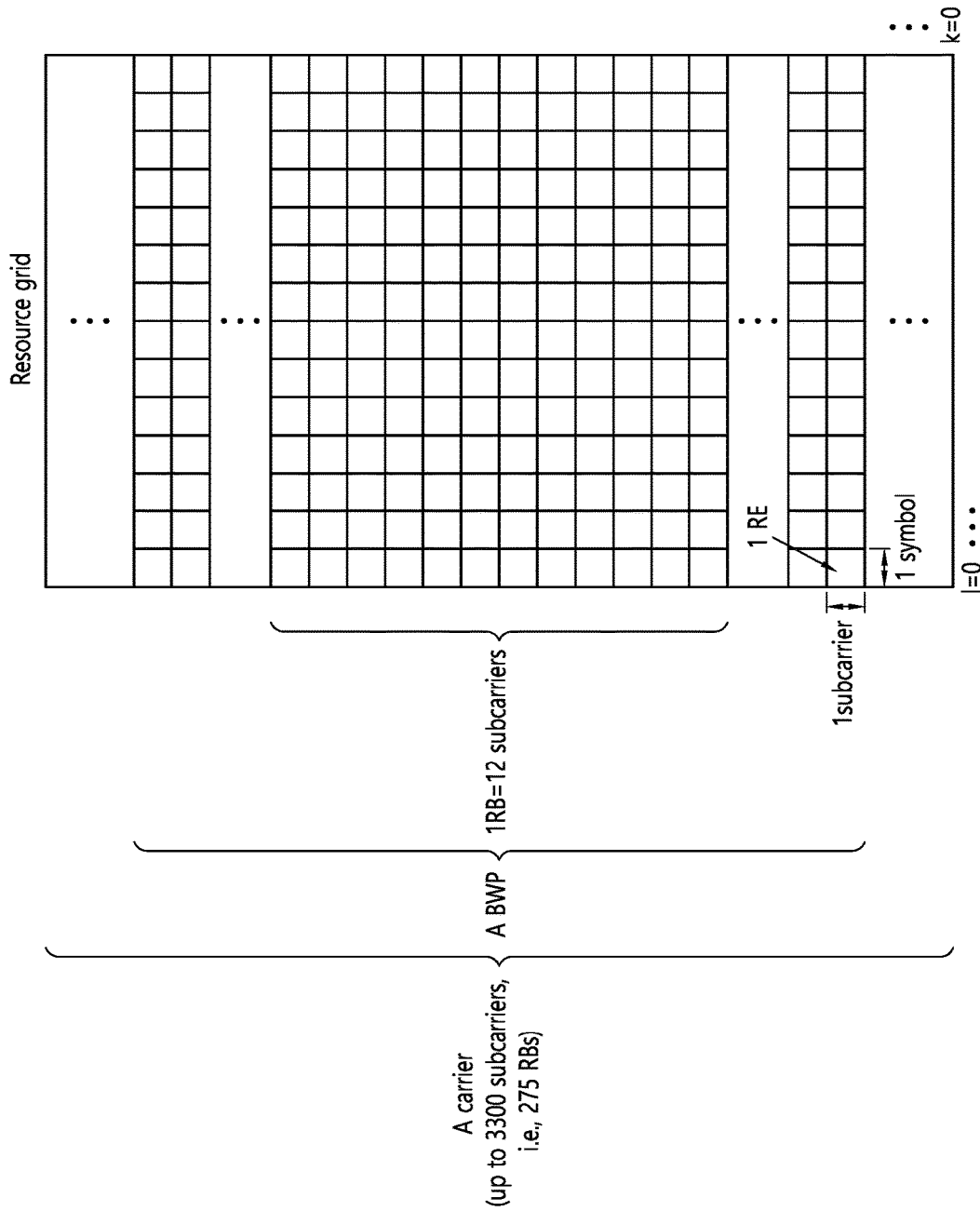
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
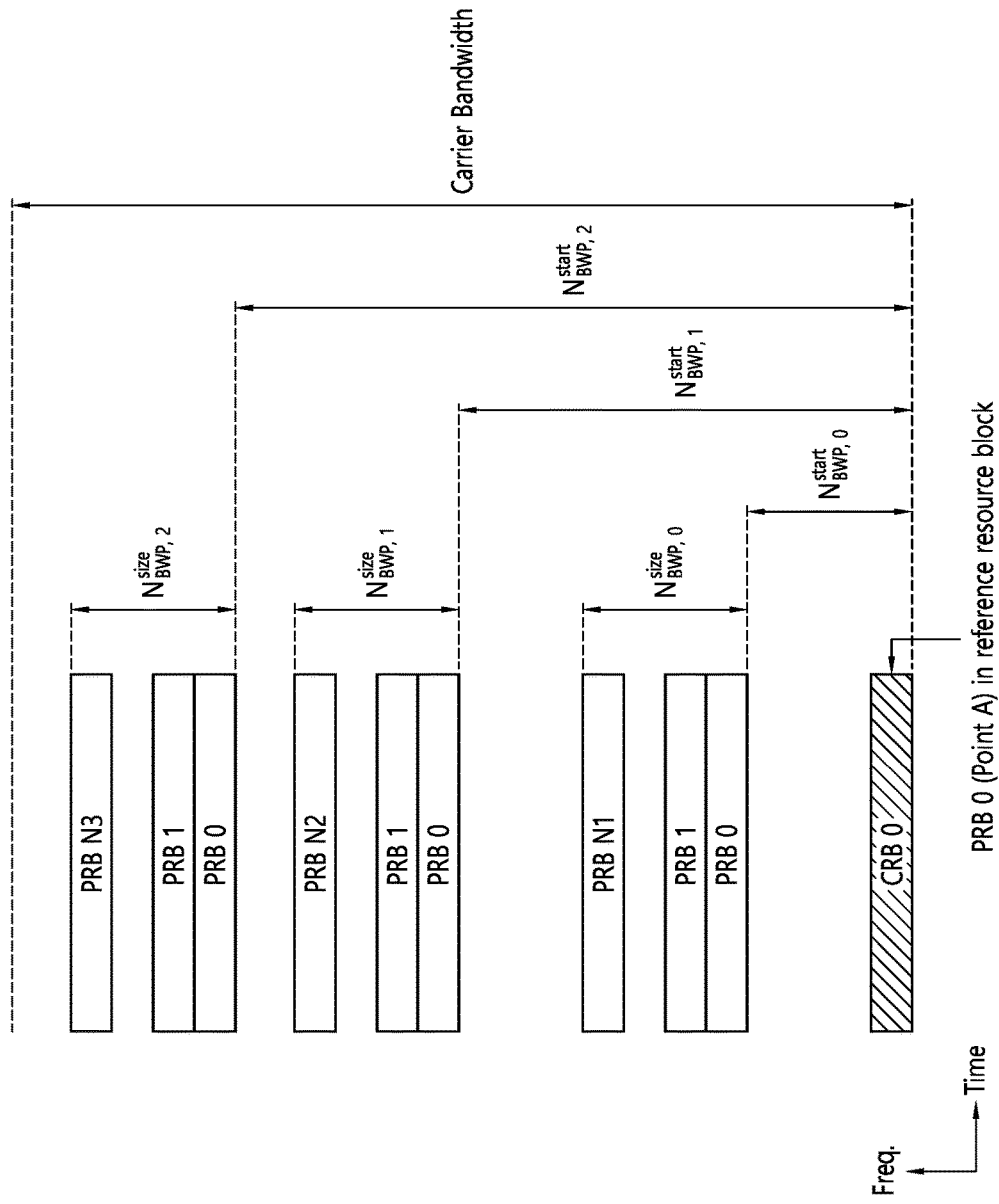
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
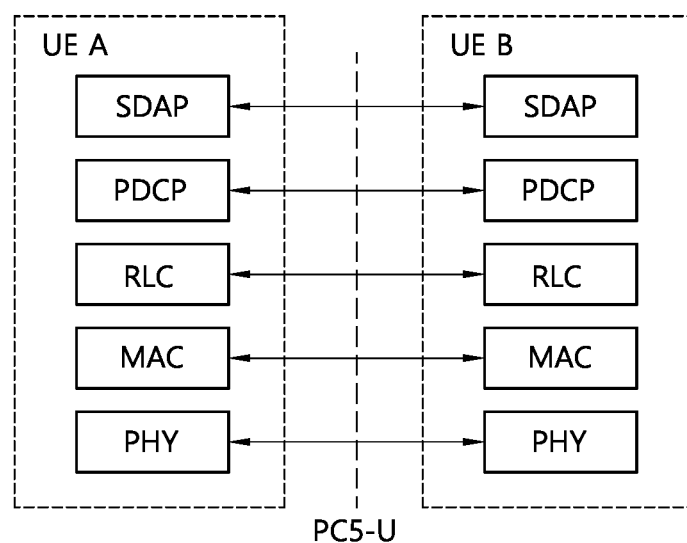
FIGS. 8A and 8B show a radio protocol architecture for a SL communication, based on an embodiment of the present disclosure.
Figure 8B:
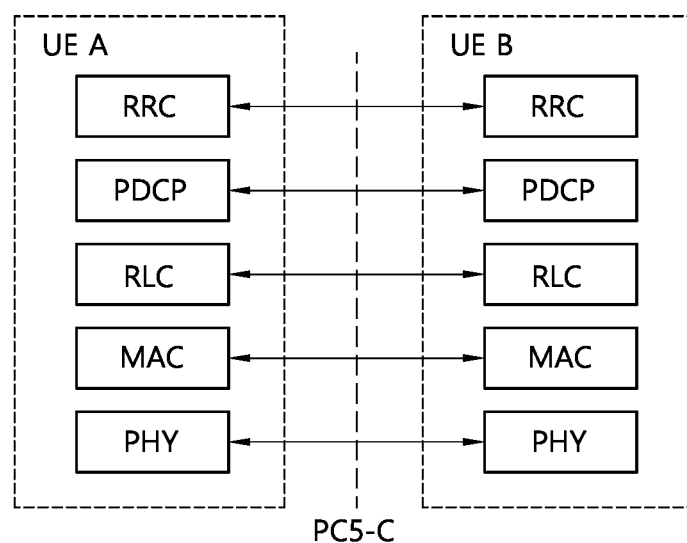

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
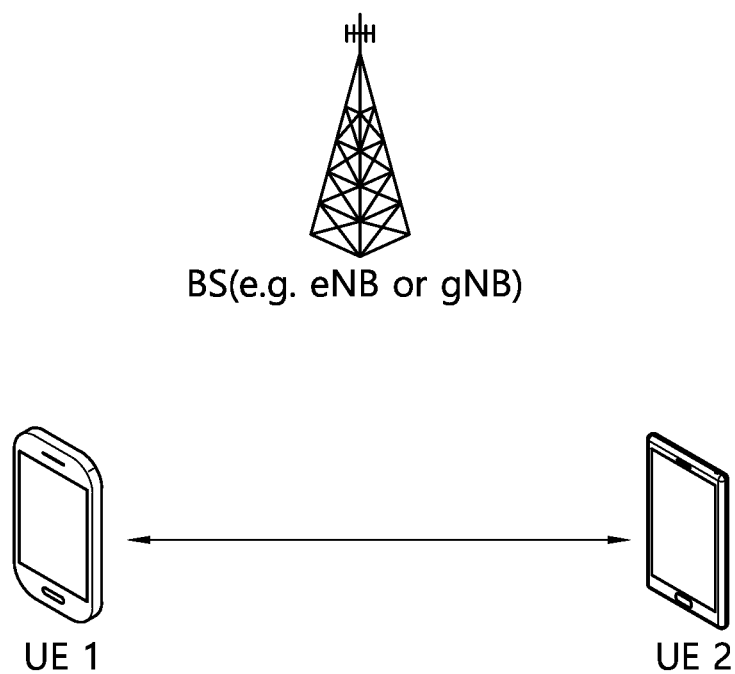
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
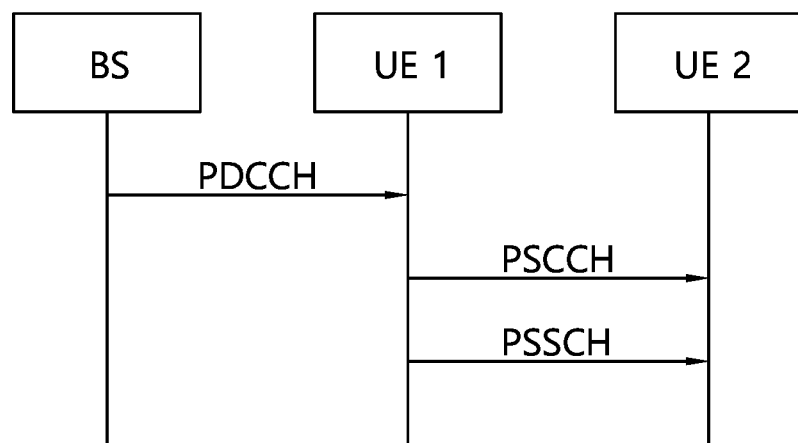
FIGS. 10A and 10B show a procedure of performing V2X or SL communication by a UE based on a transmission mode, based on an embodiment of the present disclosure.
Figure 10B:
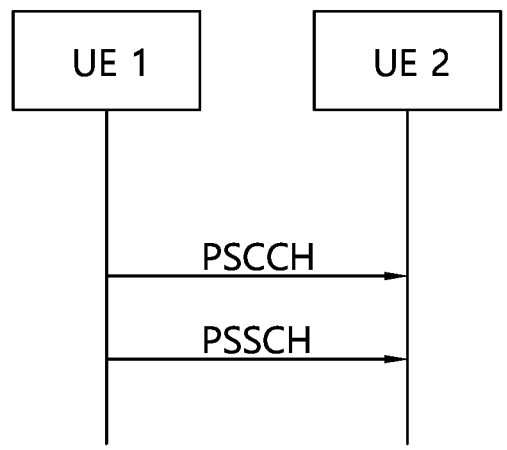

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE lmay perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
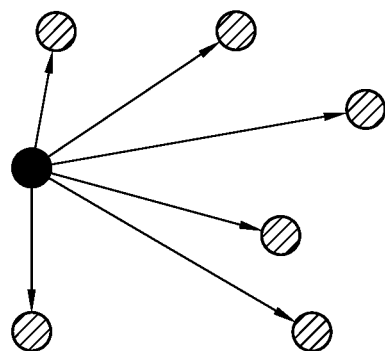
FIGS. 11A to 11C show three cast types, based on an embodiment of the present disclosure.
Figure 11B:
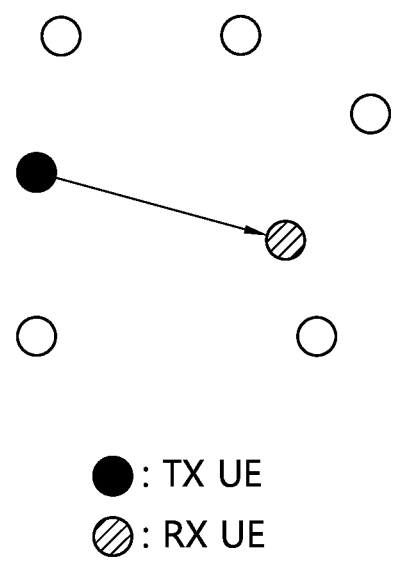
Figure 11C:
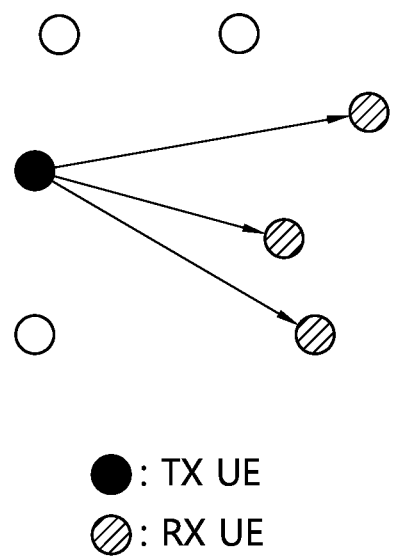

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Depending on the deployment situation of the LTE communication system and the NR communication system, a case may occur in which an LTE base station communicates with an NR user equipment (UE) or an NR base station communicates with an LTE UE. In this case, in the case of the mode in which the base station allocates resources of the UE, since there may be a difference between operations of control information transmitted by the base station and the control information interpreted by the UE, it is necessary to define a common operation for the control information between the base station and the UE in order to avoid confusion between the base station and the UE.

In the present disclosure, a method for an NR base station to allocate configured grant (CG) type-2 resource(s) to an LTE sidelink (SL) UE through NR Uu link, or a method for an LTE base station to allocate configured grant (CG) type-2 resource(s) to an NR SL UE through LTE Uu link is proposed. The two operations correspond to the equivalent operation except that the roles for NR and LTE operations are changed. In the following description, a method for controlling LTE SL through NR Uu will be described.

A process in which the NR base station allocates CG type-2 resource(s) to the LTE SL UE through an NR SL DCI may be as follows. In this case, it is assumed that the UE is equipped with both a module (it may be a part of performing an NR SL communication operation within a device or a device/module) performing an NR SL communication operation and a module (it may be a part of performing an LTE SL communication operation within a device or a device/module) performing an LTE SL communication operation.

For example, in the first operation, the NR base station may transmit an NR SL DCI including CG type-2 resource allocation information (activation/deactivation) to the UE through NR Uu link. In the second operation, the NR SL module of the UE may receive the NR SL DCI and convert it to an LTE SL DCI. In the third operation, the NR SL module may transfer the converted LTE SL DCI information to the LTE SL module. In the fourth operation, the LTE SL DCI module may activate and/or deactivate CG type-2 resource(s) according to LTE SL DCI information with respect to the first available LTE SL subframe after a timing offset (K) defined in LTE SL, and may use the CG type-2 resource(s).

In order to use the legacy LTE SL module as it is in the above process, the LTE SL module should operate according to the legacy LTE SL operation definition. The NR base station may transmit a timing offset X value necessary for the second operation and the third operation together with the timing offset K for the NR SL DCI.

In this case, the X value may be defined in units of time (ms) or in units of a slot or in units of a subframe, and may be defined as an absolute time value so that the value itself may be transmitted through the NR SL DCI. On the other hand, a table for timing offsets that can be candidate values is pre-defined, and only index of an entry corresponding to the timing offset X value in the table may be transmitted. In addition, in the case of the table for efficiently transmitting the X value, a Time Domain Resource Allocation (TDRA) table defined in NR Uu link may be reused. The TDRA table may include the following three timing-related values.

i) Timing offset in slot (K2)
ii) Starting symbol location (S)
iii) Number of consecutive symbols (L)

In order to express the timing offset X value transmitted to the LTE SL UE through NR Uu as the entries of the TDRA table, for example, methods such as the following a), b), c) may be used.

a) Use Timing offset in slot (K2)

The NR base station may determine a K2 value corresponding to a timing offset X value or the smallest K2 value among values greater than the X value to be transmitted to the LTE SL UE, and the NR base station may transmit a table index of the corresponding K2 value through the NR SL DCI.

b) Use K2+Starting symbol location (S)

The NR base station may determine a K2 value corresponding to a timing offset X value or the smallest K2+S value among values greater than the X value to be transmitted to the LTE SL UE, and the NR base station may transmit a table index of the corresponding K2+S value through the NR SL DCI.

c) Use K2+S+Number of consecutive symbols (L)

The NR base station may determine a K2 value corresponding to a timing offset X value or the smallest K2+S+L value among values greater than the X value to be transmitted to the LTE SL UE, and the NR base station may transmit a table index of the corresponding K2+S+L value through the NR SL DCI.

For the X value and the K value transmitted through the NR SL DCI as described above, the operations from the first operation to the fourth operation are performed between the NR SL module and the LTE SL module internally in the UE. In this case, an example of a process of transferring DCI between the NR SL module and the LTE SL module will be described later with reference to FIGS. 12 to 14B.

Figure 12:
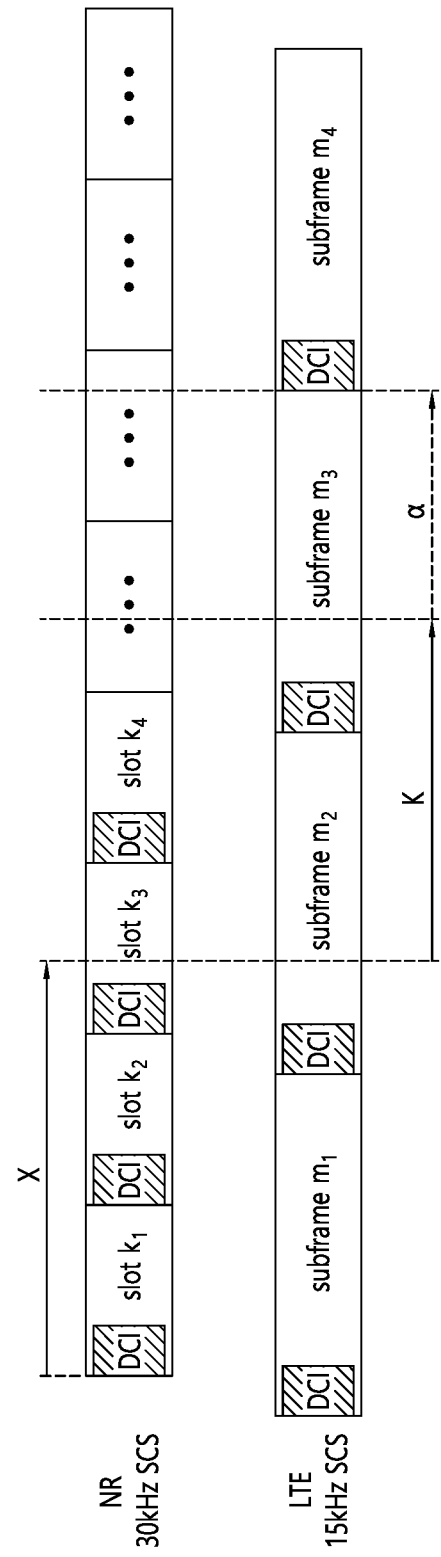
FIG. 12 shows an example of performing wireless communication based on an NR communication system and an LTE communication system.

FIG. 12 shows an example of performing wireless communication based on an NR communication system and an LTE communication system.

Hereinafter, the first embodiment will be described. Time synchronization between the NR SL slot boundary and the LTE SL subframe boundary may not be aligned. Regardless of the time synchronization, when the timing offset X and K values are received through the NR SL DCI, the NR SL module which has converted the NR SL DCI to the LTE SL DCI may start transferring the converted LTE SL DCI information to the LTE SL module after a time of the X value has elapsed from a time when the NR SL DCI reception is started or when the NR SL DCI reception is completed (slot k3 in FIG. 12), or the NR SL module may complete transferring the converted LTE SL DCI information to the LTE SL module (subframe m3 in FIG. 12) in a time of the X value (slot k3 in FIG. 12). Thereafter, the LTE SL module may activate/deactivate CG type-2 resource(s) at a time of the first available LTE SL subframe (subframe m4 in FIG. 12), after a time of the K value elapses from a time when the reception of the converted LTE SL DCI information is started or the reception is completed. In this case, an additional timing offset (a in FIG. 12) may occur according to a timing offset.

Hereinafter, the second embodiment will be described. The NR SL module may complete transferring the converted LTE SL DCI information to the LTE SL module within a time of the value X from a time when the reception of the NR SL DCI is completed. Thereafter, the LTE SL module may activate/deactivate CG type-2 resource(s) at a time of the first available LTE SL subframe after a time of the K value has elapsed from a time when the reception of the converted LTE SL DCI information is completed.

Figure 13:
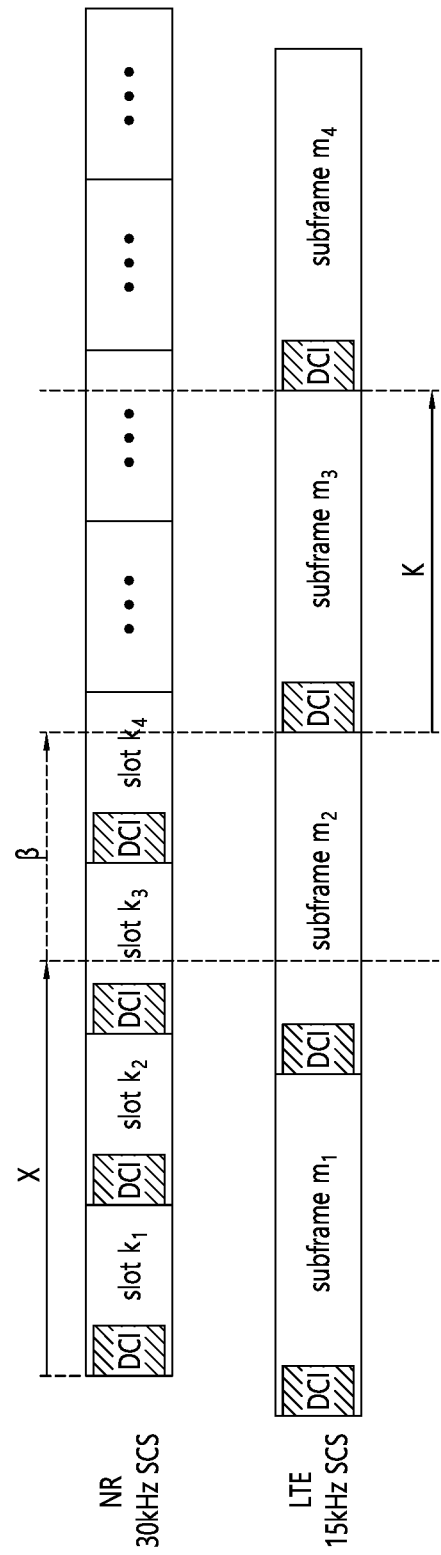
FIG. 13 shows another example of performing wireless communication based on an NR communication system and an LTE communication system.

FIG. 13 shows another example of performing wireless communication based on an NR communication system and an LTE communication system.

Hereinafter, the third embodiment will be described. The NR SL module which has converted the NR SL DCI to the LTE SL DCI may wait additional time (β in FIG. 13) until the first available LTE subframe boundary time (subframe m3 in FIG. 13), after a time of the X value has elapsed (slot k3 in FIG. 13) from a time when the NR SL DCI reception is started or the NR SL DCI reception is completed. Thereafter, the NR SL module may transfer the converted LTE SL DCI to the LTE SL module. Thereafter, the LTE SL module may activate/deactivate CG type-2 resource(s) at a time of the first available LTE SL subframe (subframe m4 in FIG. 13), after a time of the K value elapses from a time when the reception of the converted LTE SL DCI information is started or the reception is completed. In the case of an LTE SL operation, since the K value indicates/represents a timing offset in units of a subframe, an additional timing offset may not occur as shown in FIG. 13.

Hereinafter, the fourth embodiment will be described. If the NR SL module determines that a time when the delivery of the converted LTE SL DCI information to the LTE SL module is completed within a time of the X value from a time when the NR SL DCI reception is completed is not aligned with a time when the LTE SL DCI reception is completed within a LTE SL subframe, the NR SL module may complete transferring the converted LTE SL DCI information to the LTE SL module within an additional time (β in FIG. 13) required until a reception completion time of the LTE SL DCI in the first available LTE subframe thereafter. Thereafter, the LTE SL module may activate/deactivate CG type-2 resource(s) at a time of the first available LTE SL subframe after a time of the K value has elapsed from a time when the reception of the converted LTE SL DCI information is completed.

Figure 14A:
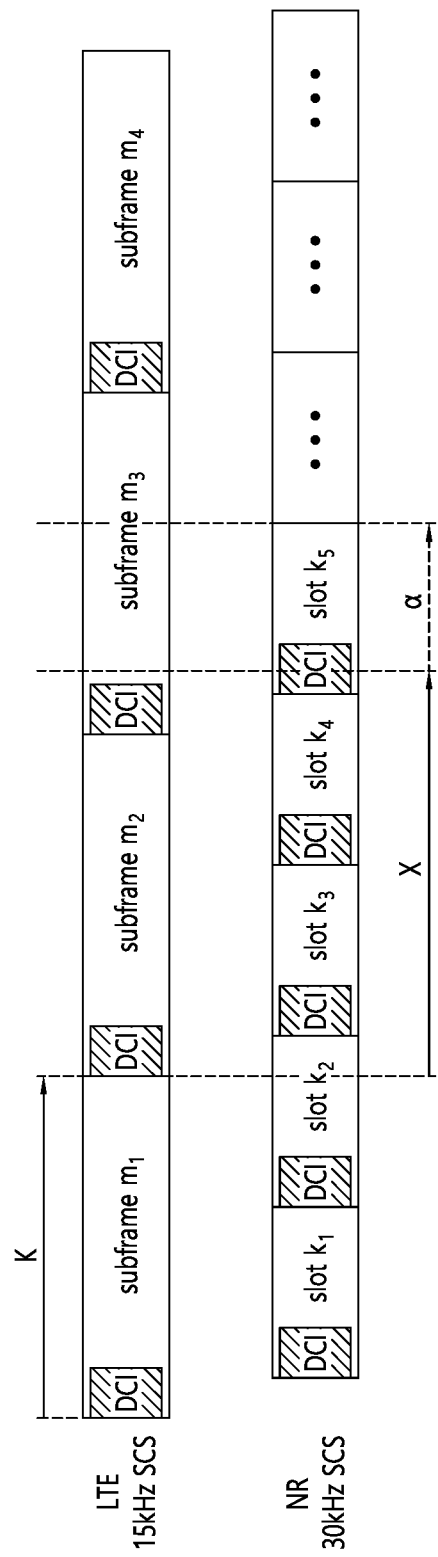
FIGS. 14A and 14B show another example of performing wireless communication based on an NR communication system and an LTE communication system.
Figure 14B:
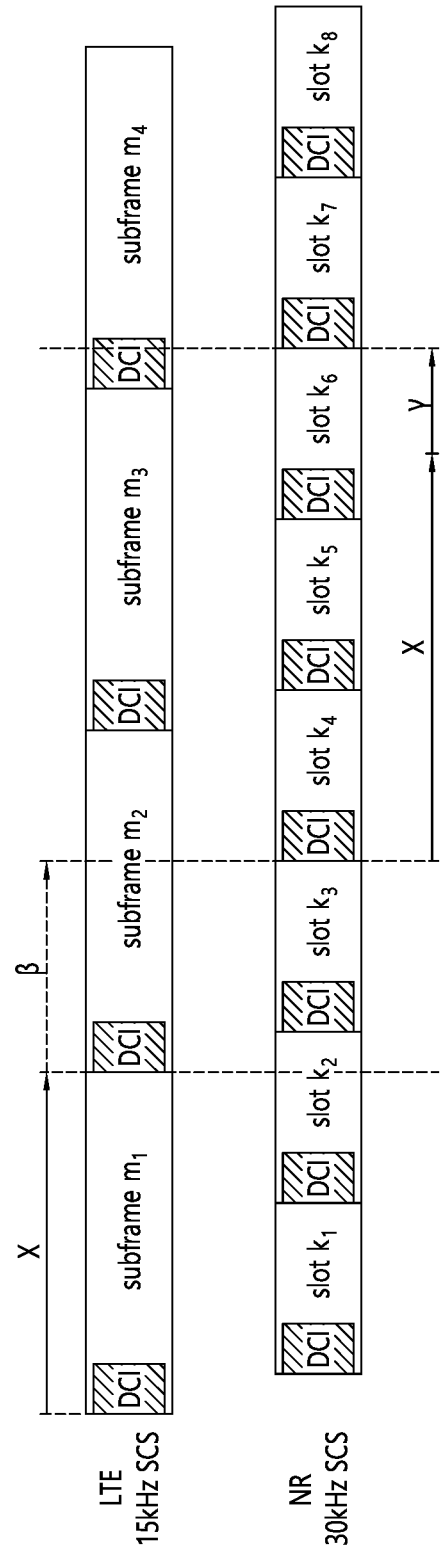

FIGS. 14A and 14B show another example of performing wireless communication based on an NR communication system and an LTE communication system.

In the description of FIGS. 14A and 14B, a method for controlling NR SL CG type-2 resource(s) through an LTE SL DCI transmitted by an LTE base station through Uu link will be described. The operations of FIGS. 14A and 14B may be interpreted as that the operation of the NR base station is performed by the LTE base station, the operation of the NR SL module inside the UE is performed by the LTE SL module, and the operation of the LTE SL module is performed by the NR SL module in the operation related to FIG. 12 or FIG. 13. In this case, if the base station configures a timing offset X for which the NR SL module should wait and a timing offset K for which the LTE SL module should wait in the LTE SL DCI transferring/processing process, in the same manner as in the description of FIG. 12 or FIG. 13, the operations described by FIGS. 12 and 13 may be replaced with FIGS. 14A and 14B, respectively.

The difference from the operation in which the NR base station allocates resource(s) to the LTE SL UE (in FIG. 12 or FIG. 13) is that a timing offset (y in FIG. 14B) for which the NR SL module should additionally wait as in FIG. 14B may occur. This is because the timing offset K defined in the LTE SL operation is given as an offset in units of a subframe, but the timing offset X value defined in the NR SL operation may be given as an absolute time value (e.g., ms).

The operations proposed in FIGS. 12 to 14B are not limited to inter-RAT communication between the NR communication system and the LTE communication system, but can be generally applied to inter-RAT communication between different heterogeneous communication systems.

In FIGS. 12 to 14B, the operation required to activate/deactivate CG type-2 resource(s) to the LTE SL UE based on the NR SL DCI transmitted by the NR base station through NR Uu link is proposed. A method for the UE to operate efficiently is proposed, even if the NR and LTE communication systems use different subcarrier spacing and the NR slot boundary and the LTE subframe boundary are out of synchronization with each other, with respect to the timing offset X value and the timing offset K value configured by the base station through the DCI.

FIG. 15 shows a procedure in which sidelink communication is performed based on wireless communication between a first device, a second device, and a base station, based on an embodiment of the present disclosure.

In step S1510, the first device according to an embodiment may transmit UE capability information of the first device to the base station. In step S1520, the first device according to an embodiment may receive RRC parameter(s) based on UE capability information from the base station. In step S1530, the first device according to an embodiment may perform LTE sidelink transmission to the second device, based on first timing offset candidate values configured based on the RRC parameter(s) related to LTE sidelink transmission to the second device.

Hereinafter, embodiments directly or indirectly related to at least one of steps S1510 to S1530 will be described.

In Uu link-based communication and SL communication, if transmission resource(s) is allocated, or activation/release for the allocated resource(s) is indicated/informed, or the location of time and frequency domains of control and data channels is indicated/informed, or the location of time and frequency domains of the channels and the resource allocation from a specific channel or a reference time point is indicated/informed, or a specific operation of the UE from a specific condition or a reference time point is indicated/informed, or a specific time point for the above-described operations between channels and BWPs using different numerology is indicated/informed, by the base station to a UE or by one UE to another UE, the base station may configure to perform the corresponding operation after a specific timing offset from the reference time point.

The embodiment(s) proposes a method for configuring efficiently a specific timing offset by the base station to the UE or by one UE to another UE Timing offset(s) may be (pre-)configured through RRC signaling which is higher layer signaling, or may be indicated/configured through a DCI/SCI, a MAC CE, etc. As a method for indicating/configuring timing offset(s), the following embodiments may be used.

In one embodiment, as a method for indicating/configuring timing offset value(s) itself, a range of a timing offset value may be (pre-)configured, and an any timing offset value may be indicated/configured with a resolution according to a given number of bits within the configured range. Although it is a method that can indicate/configure timing offset value(s) flexibly without conditions, there is a limit of resolution according to a given number of bits and a limit by the pre-configured range.

In another embodiment, any timing offset values that can be candidate values may be pre-configured or determined by higher layer signaling, and a table may be configured with these values. If intend to indicate/configure a specific value as a timing offset value, a table index value corresponding to the timing offset value may be indicated/configured. Through this embodiment, there may be no restrictions on the resolution of candidate timing offset values, and it is possible to significantly reduce the signaling overhead required to indicate/configure the timing offset because the number of bits required to express indexes determined by the number of table elements is small compared to the number of bits required to transmit a timing offset value. However, there is a disadvantage in that timing offset values that can be indicated/configured should be limited to specific values in advance or by higher layer signaling.

In another embodiment, in the case of the above candidate values, a reference timing offset value may be determined instead of any timing offset values that can be candidate values, and difference values between the reference timing offset value and any timing offset values that can be candidate values may be used as table elements. The method of indicating/configuring a specific timing offset value may be performed by signaling a table index corresponding to the timing offset value. This has an advantage in that a timing offset value can be expressed with a relatively higher resolution in a given number of bits for processing, compared to the method of configuring the candidate timing offset values themselves as table elements.

In another embodiment, instead of pre-configuring candidate timing offset values or configuring candidate timing offset values based on higher layer signaling, a method of expressing candidate timing offset values as a unit value for a reference timing offset value and relative difference values from the reference timing offset value may be used. For example, if the relative difference value with respect to the reference timing offset value is referred to as a delta, candidate timing offset values may include, for example, the following values.

Index 0: Reference Timing Offset Value
Index 1: Reference Timing Offset Value+Delta
Index 2: Reference Timing Offset Value+2*Delta
Index (N−1): Reference Timing Offset Value+(N−1)*Delta In the above description, the value of N is the number of candidate timing offset values. In order to indicate/configure a specific timing offset value, only the index value needs to be signaled. The receiving UE may restore a specific timing offset value by using a pre-configured reference timing offset value and an index value for a signaled unit difference value.

Since the above-described methods signal the entire table including all candidate timing offset values, or signal the entire table including difference values between the reference timing offset value and all candidate timing offset values compared to the reference timing offset value, an overhead for signaling the entire table representing candidate timing offset values is very large. On the other hand, the method using the above-described unit difference value has the advantage of remarkably reducing the signaling overhead because only the reference timing offset value and the unit difference value need to be signaled.

As an embodiment of a method of using a table including the reference timing offset value and candidate timing offset values related to the reference timing offset value, or a method of using a table including difference values from candidate timing offset values, or a method of signaling by expressing difference values from candidate timing offset values as an index of a unit difference value previously described, an SL inter-RAT timing offset indication method may be used.

In SL inter-RAT communication, an operation in which one RAT system indicates/configures a timing offset to another heterogeneous RAT system may be applied. In one embodiment, if the NR base station configures a type-2 configured grant (CG) to the LTE SL UE and indicates activation/release for resource(s) configured by the type-2 CG through a SL DCI, the NR base station may configure a specific timing offset through the SL DCI, and the LTE SL UE may apply activation/release for the type-2 CG with respect to the first available LTE SL subframe after the configured timing offset.

In this case, the timing offset value configured by the NR base station through the SL DCI is the X+Z value, and the definition of each value is as follows. In this case, it is assumed that the UE is equipped with both the NR SL module and the LTE SL module, and data and control information transmission between both modules is also possible.

For example, the value of X may be a minimum time required from a time when the NR SL module completes receiving the NR DCI which configures the timing offset of the X+Z value, to a time when the NR SL module completes transmitting the converted LTE SL DCI to the LTE SL module after decoding the NR DCI and converting it to the LTE SL DCI.

For example, the value of Z may be a timing offset value required from a time when the LTE SL module completes receiving the converted LTE SL DCI, to a time when the first available LTE SL subframe is reached and activation/release for the type-2 CG is applied after at least a timing offset of the value of Z has elapsed.

In this case, since the NR base station does not know a time required for the UE to perform all operations necessary for decoding/conversion/transmission, etc. from the completion of the NR DCI reception to the completion of the LTE SL DCI transmission, the UE may report the minimum time value X required to perform the above operations to the NR base station as a capability of the UE.

In this case, in order to apply the timing offset indication/configuration method described above, the NR base station may determine the minimum value for X reported from the UE as the reference timing offset value. Based on the reference timing offset value determined between the NR base station and the UE, the NR base station may (pre-)configure a table of candidate timing offset X values configured as difference values with the reference timing offset to the UE through higher layer signaling (e.g., RRC signaling), or the NR base station may determine a unit difference value for expressing difference values with the reference timing offset value and (pre-)configure it to the UE through higher layer signaling (e.g., RRC signaling).

For example, the reference timing offset value may have the same/similar meaning as the first timing offset of FIG. 16 or FIG. 17 to be described later.

For example, the candidate timing offset X values may have the same/similar meaning as first timing offset candidates or second timing offset candidates of FIG. 16 or FIG. 17 to be described later.

In one embodiment, if a table including 8 timing offset X values is configured to the UE through higher layer signaling, the first entry of the table is configured with the X value reported from the UE as UE capability, and the remaining entries of the table may be determined in the following way.

For example, the remaining entries may be configured as values which are integer multiples, i.e., 2 times, 3 times, . . . , 8 times, of the first entry.

In another example, the remaining entries may be configured by adding integer multiples of the slot duration including the slot (time) duration to the first entry value. Since the slot duration varies according to sub-carrier spacing (SCS), as a result, the physical time value of the table entry may vary according to the SCS.

That is, the entries may be determined as the first entry, the first entry+slot duration, the first entry+2*slot duration, . . . , the first entry+7*slot duration.

In another example, the remaining entries may be configured by adding integer multiples of a specific physical time value to the first entry value. For example, entries may be configured by adding integer multiples of the 1 ms value including the 1 ms value.

That is, the entries may be determined as the first entry, the first entry+1 ms, the first entry+2 ms, . . . , the first entry+7 ms.

If the NR base station indicates/configures the X value to the UE through the NR SL DCI, the NR base station may signal an index of the table configured with the difference values, or the NR base station may signal an index value representing/expressing an integer multiple of a unit difference value, or the NR base station may signal an index of the table configured with candidate timing offset values, or the NR base station may signal a candidate timing offset value itself.

For example, the X value indicated/signaled by the NR base station to the UE through the NR SL DCI may correspond to the second timing offset of FIG. 16 or FIG. 17 to be described later.

In this case, the UE may expect that the network configures the size of the NR DCI for scheduling LTE SL (e.g., to activate or deactivate an LTE SL configured grant) to be always smaller than or equal to the NR SL DCI for scheduling NR SL. In this case, the NR DCI for scheduling LTE SL may be zero-padded to match the size of the NR SL DCI for scheduling NR SL.

If the size of the NR DCI for scheduling LTE SL is larger than the size of the NR SL DCI for scheduling NR SL, the following operation may be performed.

For example, the NR SL DCI for scheduling NR SL may be zero-padded to match the size of the NR DCI for scheduling LTE SL.

In another example, since the zero padding may deteriorate the decoding performance of the NR SL DCI, the network may transmit the NR DCI for scheduling LTE SL through a search space that does not overlap with a search space in which the NR SL DCI for scheduling NR SL is transmitted.

In the embodiment(s) of FIG. 15, an efficient method for configuring timing offset(s) from the reference timing point in SL communication is proposed. If the inter-RAT timing offset(s) is configured according to the proposed method, it can have the advantage of efficiently expressing the timing offset(s) while minimizing the signaling overhead required for configuring the timing offset(s). In addition, a method for operating a search space for NR DCI monitoring for scheduling LTE SL is proposed.

Figure 16:
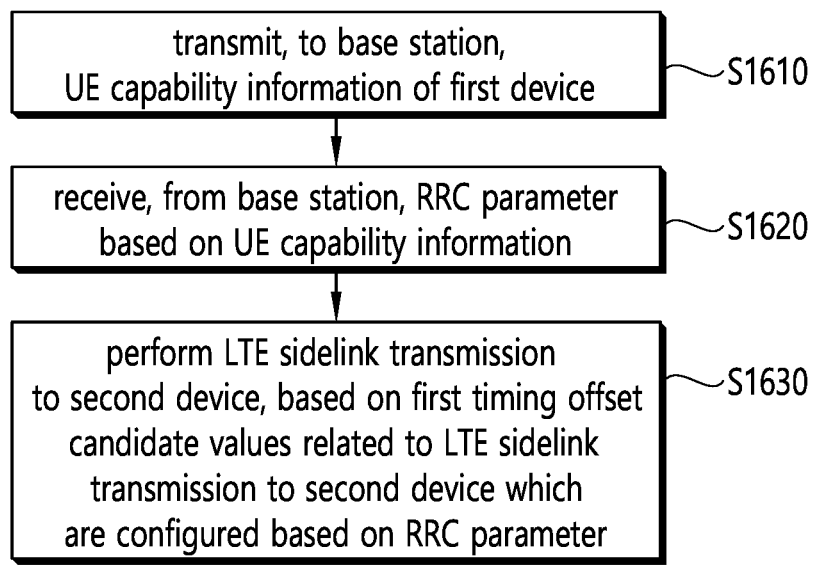
FIG. 16 shows operations of a first device, based on an embodiment of the present disclosure.

FIG. 16 shows operations of a first device, based on an embodiment of the present disclosure.

The operations disclosed in the flowchart of FIG. 16 may be performed in combination with various embodiments of the present disclosure. For example, the operations disclosed in the flowchart of FIG. 16 may be performed based on at least one of devices illustrated in FIGS. 18 to 23. For example, the first device of FIG. 16 may be the first wireless device 100 of FIG. 19 to be described later. In another example, the first device of FIG. 16 may be the second wireless device 200 of FIG. 19 to be described later.

In step S1610, the first device according to an embodiment may transmit, to a base station, UE capability information of the first device.

For example, the base station may be referred to as an NR base station.

In step S1620, the first device according to an embodiment may receive, from the base station, a radio resource control (RRC) parameter based on the UE capability information. That is, the first device may receive a configuration related to the UE capability information from the base station through higher layer signaling (e.g., RRC signaling).

In step S1630, the first device according to an embodiment may perform Long Term Evolution (LTE) sidelink transmission to a second device, based on first timing offset candidate values related to the LTE sidelink transmission to the second device which are configured based on the RRC parameter.

For example, a first timing offset included in the UE capability information may be one of the first timing offset candidate values.

For example, the first timing offset may refer to a reference timing offset. Also, the first timing offset candidate values may refer to timing offset X values.

For example, the first timing offset candidate values may be included in one timing offset table.

The first device according to an embodiment may receive, from the base station, a first NR downlink control information (DCI) for the LTE sidelink transmission.

For example, the first NR DCI may include information representing a second timing offset which is one of the first timing offset candidate values.

For example, performing the LTE sidelink transmission to the second device may comprise: performing the LTE sidelink transmission to the second device based on the second timing offset among the first timing offset candidate values.

For example, the first timing offset may be one of second timing offset candidate values configurable by the base station to the first device, and the second timing offset candidate values may include the first timing offset candidate values, and the first timing offset candidate values among the second timing offset candidate values may be determined based on the first timing offset.

For example, a total number of the first timing offset candidate values may be eight.

For example, the first timing offset candidate values may include the first timing offset and timing offsets greater than the first timing offset among the second timing offset candidate values.

For example, the first timing offset candidate values may include the first timing offset and values of integer multiples of the first timing offset among the second timing offset candidate values.

For example, the first timing offset candidate values may include the first timing offset and timing offsets obtained by adding integer multiples of a slot duration to the first timing offset among the second timing offset candidate values.

For example, the first timing offset candidate values may include the first timing offset and timing offsets obtained by adding integer multiples of a pre-configured time to the first timing offset among the second timing offset candidate values.

The first device according to an embodiment may receive, from the base station, a second NR DCI for NR sidelink transmission.

For example, a size of the first NR DCI may be less than or equal to a size of the second NR DCI.

The first device according to an embodiment may receive, from the base station, a second NR DCI for NR sidelink transmission.

For example, a size of the first NR DCI may be greater than a size of the second NR DCI.

The first device according to an embodiment may match the size of the first NR DCI and the size of the second NR DCI by applying zero padding to the second NR DCI.

For example, a search space in which the first NR DCI is received may not overlap a search space in which the second NR DCI is received.

Based on an embodiment of the present disclosure, a first device configured to perform sidelink (SL) communication may be provided. The first device may comprise: at least one memory storing instructions; at least one transceiver; and at least one processor connected to the at least one memory and the at least one transceiver. The at least one processor may execute the instructions to: transmit, to a base station, UE capability information of the first device; receive, from the base station, a radio resource control (RRC) parameter based on the UE capability information; and perform Long Term Evolution (LTE) sidelink transmission to a second device, based on first timing offset candidate values related to the LTE sidelink transmission to the second device which are configured based on the RRC parameter, wherein a first timing offset included in the UE capability information is one of the first timing offset candidate values.

Based on an embodiment of the present disclosure, an apparatus (or chip (set)) configured to control a first user equipment (UE) may be provided. The apparatus may comprise: at least one processor; and at least one memory connected to the at least one processor and storing instructions. The at least one processor may execute the instructions to: transmit, to a base station, UE capability information of the first UE; receive, from the base station, a radio resource control (RRC) parameter based on the UE capability information; and perform Long Term Evolution (LTE) sidelink transmission to a second UE, based on first timing offset candidate values related to the LTE sidelink transmission to the second UE which are configured based on the RRC parameter, wherein a first timing offset included in the UE capability information is one of the first timing offset candidate values.

For example, the first UE of the embodiment may refer to the first device described in the present disclosure. For example, each of the at least one processor and the at least one memory in the apparatus configured to control the first UE may be implemented as a separate sub-chip, or at least two or more components may be implemented through one sub-chip.

Based on an embodiment of the present disclosure, a non-transitory computer-readable storage medium storing instructions may be provided. The instructions, when executed, may cause a first device to: transmit, to a base station, UE capability information of the first device; receive, from the base station, a radio resource control (RRC) parameter based on the UE capability information; and perform Long Term Evolution (LTE) sidelink transmission to a second device, based on first timing offset candidate values related to the LTE sidelink transmission to the second device which are configured based on the RRC parameter, wherein a first timing offset included in the UE capability information is one of the first timing offset candidate values.

Figure 17:
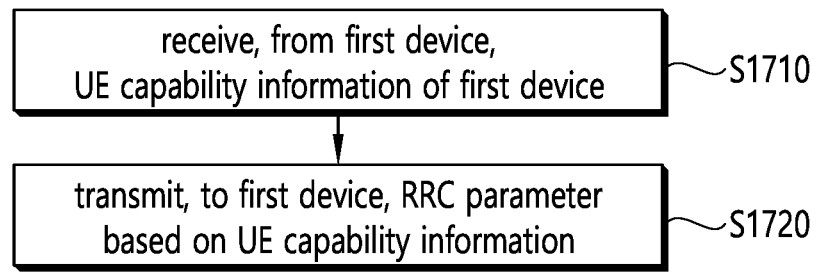
FIG. 17 shows operations of a base station, based on an embodiment of the present disclosure.

FIG. 17 shows operations of a second device, based on an embodiment of the present disclosure.

The operations disclosed in the flowchart of FIG. 17 may be performed in combination with various embodiments of the present disclosure. For example, the operations disclosed in the flowchart of FIG. 17 may be performed based on at least one of devices illustrated in FIGS. 18 to 23. For example, the second device of FIG. 17 may be the second wireless device 200 of FIG. 19 to be described later. In another example, the second device of FIG. 17 may be the first wireless device 100 of FIG. 19 to be described later.

In step S1710, the base station according to an embodiment may receive, from a first device, UE capability information of the first device.

For example, the base station may be referred to as an NR base station.

In step S1720, the base station according to an embodiment may transmit, to the first device, a radio resource control (RRC) parameter based on the UE capability information. That is, the base station may transmit a configuration related to the UE capability information through higher layer signaling (e.g., RRC signaling).

For example, based on the RRC parameter, first timing offset candidate values related to Long Term Evolution (LTE) sidelink transmission from the first device to a second device may be configured for the first device.

For example, a first timing offset included in the UE capability information may be one of the first timing offset candidate values.

For example, the first timing offset may refer to a reference timing offset. Also, the first timing offset candidate values may refer to timing offset X values.

For example, the first timing offset candidate values may be included in one timing offset table.

The base station according to an embodiment may transmit, to the first device, a first NR downlink control information (DCI) for the LTE sidelink transmission.

For example, the first NR DCI may include information representing a second timing offset which is one of the first timing offset candidate values.

For example, performing the LTE sidelink transmission to the second device may comprise: performing the LTE sidelink transmission to the second device based on the second timing offset among the first timing offset candidate values.

For example, the first timing offset may be one of second timing offset candidate values configurable by the base station to the first device, and the second timing offset candidate values may include the first timing offset candidate values, and the first timing offset candidate values among the second timing offset candidate values may be determined based on the first timing offset.

For example, a total number of the first timing offset candidate values may be eight.

For example, the first timing offset candidate values may include the first timing offset and timing offsets greater than the first timing offset among the second timing offset candidate values.

For example, the first timing offset candidate values may include the first timing offset and values of integer multiples of the first timing offset among the second timing offset candidate values.

For example, the first timing offset candidate values may include the first timing offset and timing offsets obtained by adding integer multiples of a slot duration to the first timing offset among the second timing offset candidate values.

For example, the first timing offset candidate values may include the first timing offset and timing offsets obtained by adding integer multiples of a pre-configured time to the first timing offset among the second timing offset candidate values.

The first device according to an embodiment may receive, from the base station, a second NR DCI for NR sidelink transmission.

For example, a size of the first NR DCI may be less than or equal to a size of the second NR DCI.

The first device according to an embodiment may receive, from the base station, a second NR DCI for NR sidelink transmission.

For example, a size of the first NR DCI may be greater than a size of the second NR DCI.

The first device according to an embodiment may match the size of the first NR DCI and the size of the second NR DCI by applying zero padding to the second NR DCI.

For example, a search space in which the first NR DCI is received may not overlap a search space in which the second NR DCI is received.

Based on an embodiment of the present disclosure, a base station configured to perform wireless communication may be provided. The base station may comprise: at least one memory storing instructions; at least one transceiver; and at least one processor connected to the at least one memory and the at least one transceiver. The at least one processor may execute the instructions to: receive, from a first device, UE capability information of the first device; and transmit, to the first device, a radio resource control (RRC) parameter based on the UE capability information, wherein, based on the RRC parameter, first timing offset candidate values related to Long Term Evolution (LTE) sidelink transmission from the first device to a second device are configured for the first device, and wherein a first timing offset included in the UE capability information is one of the first timing offset candidate values.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
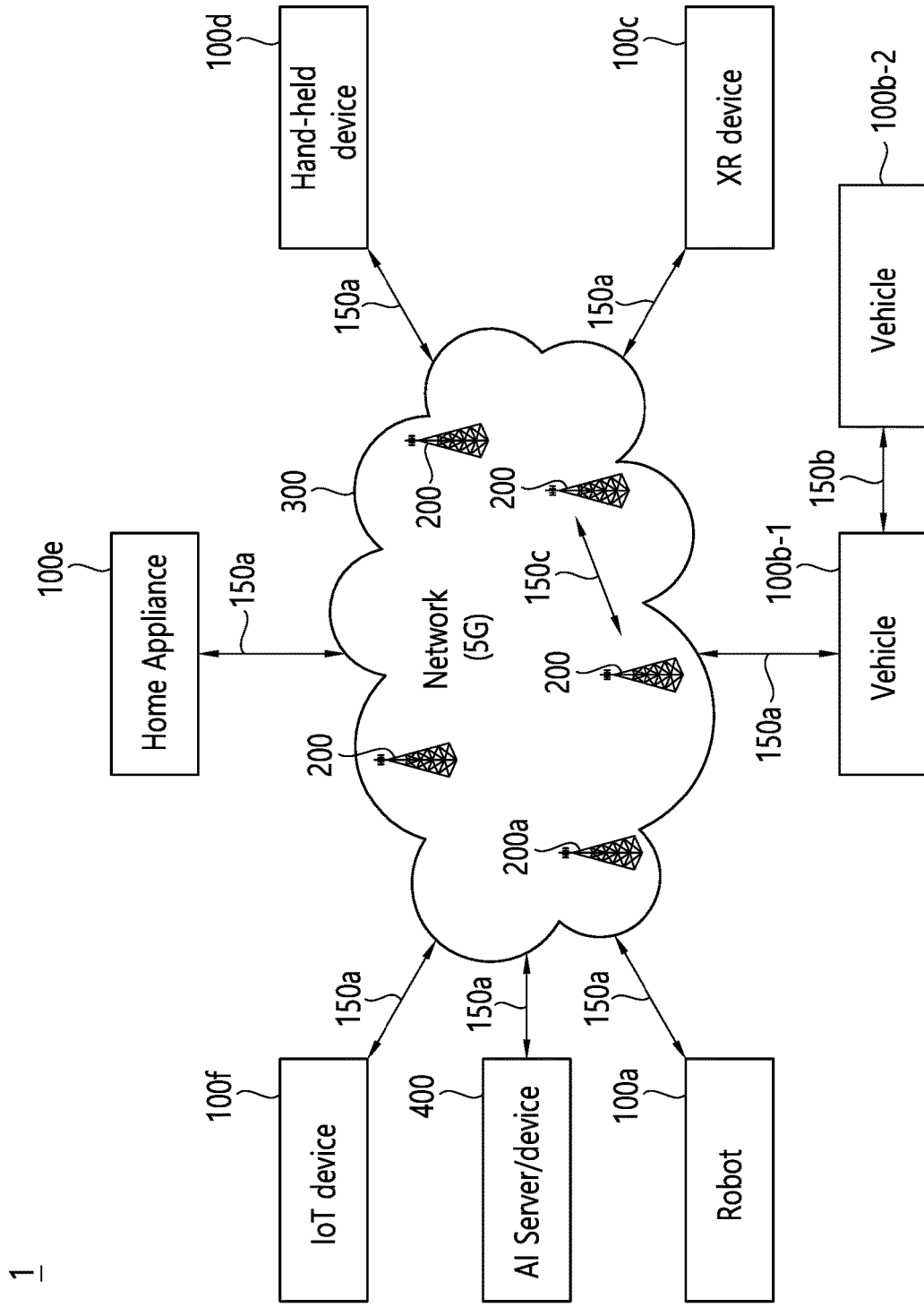
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Herein, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
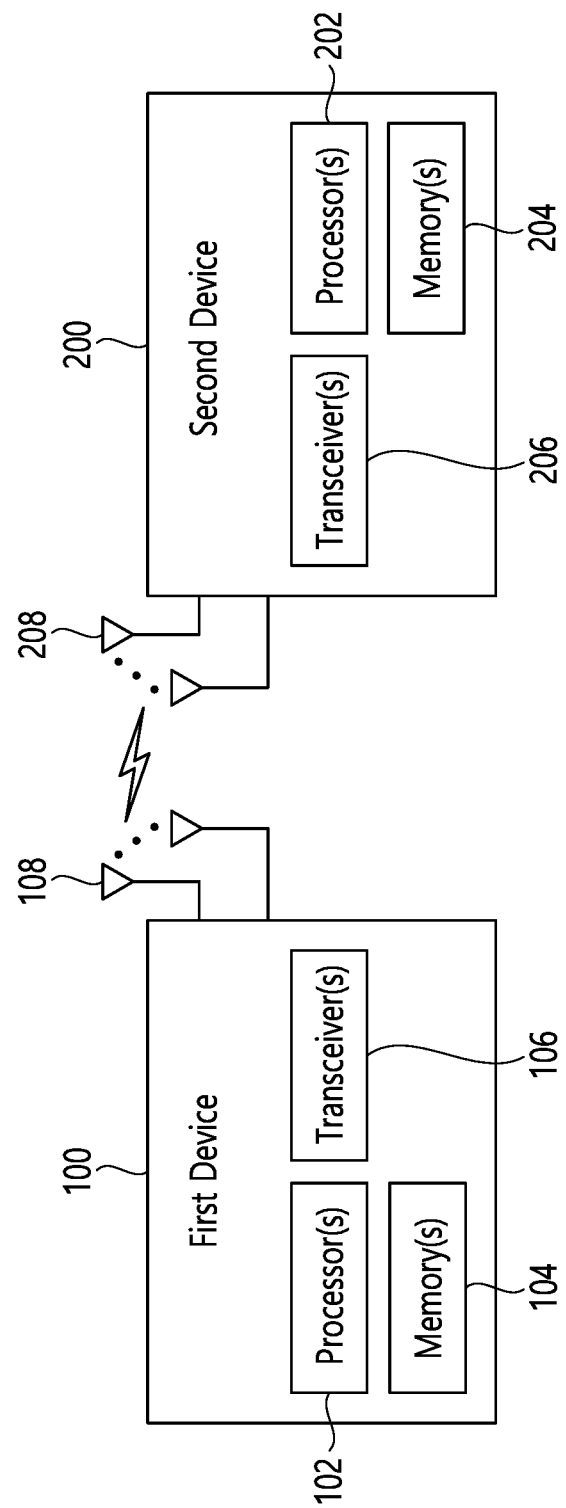
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
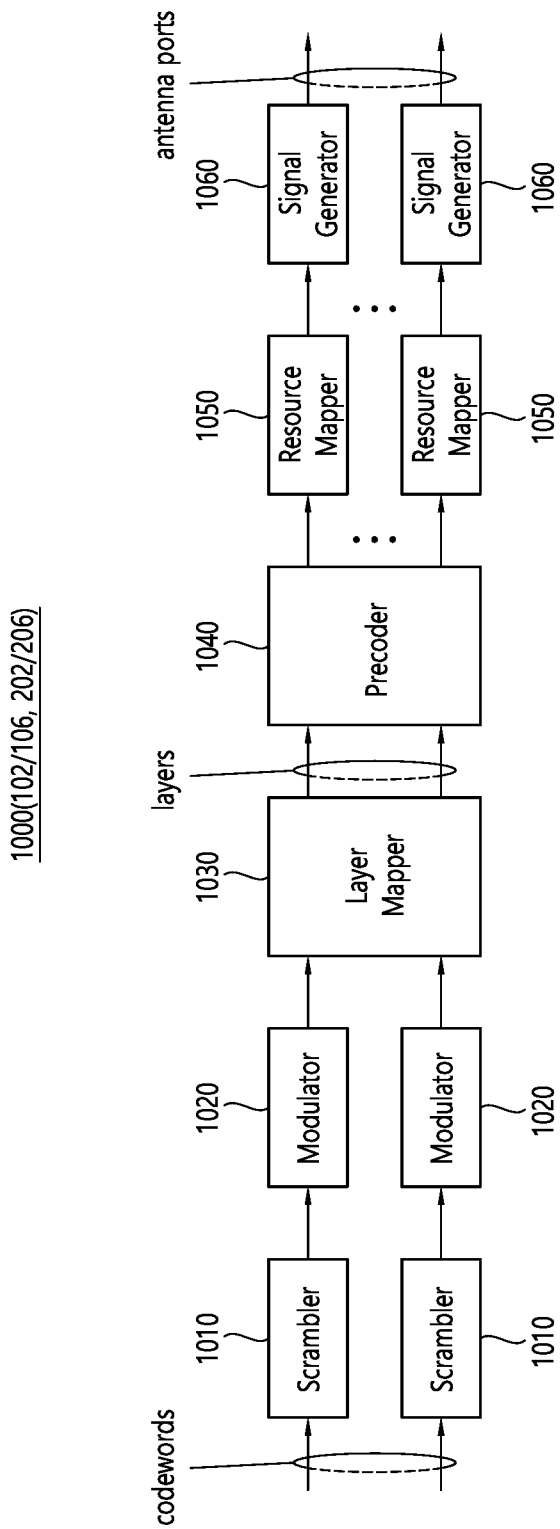
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
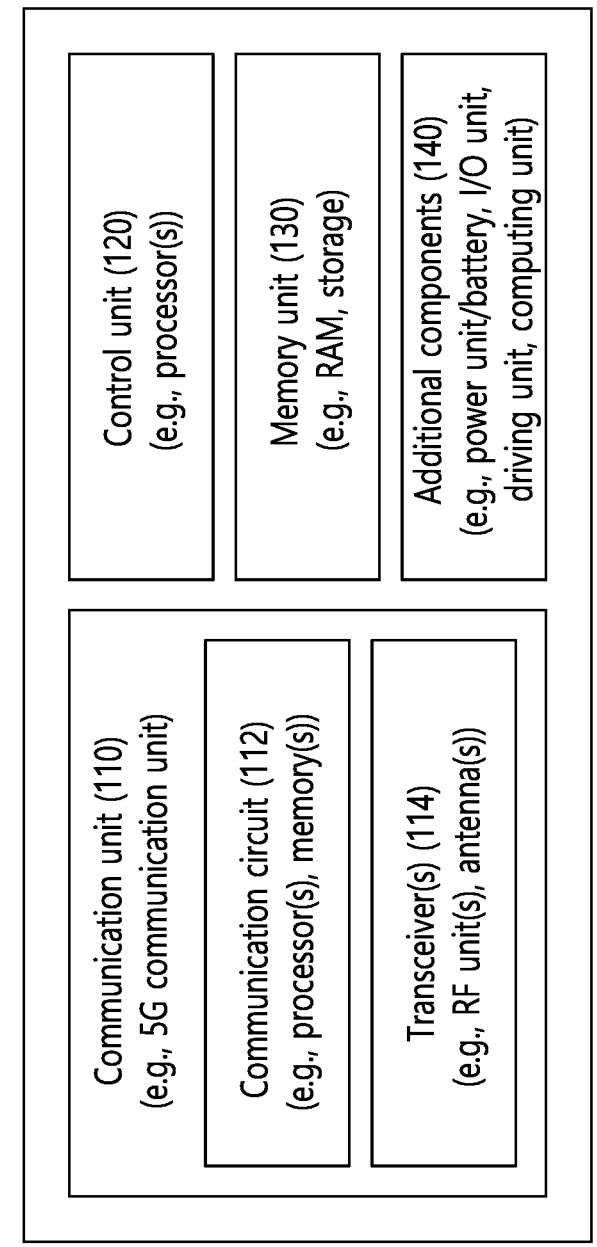
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
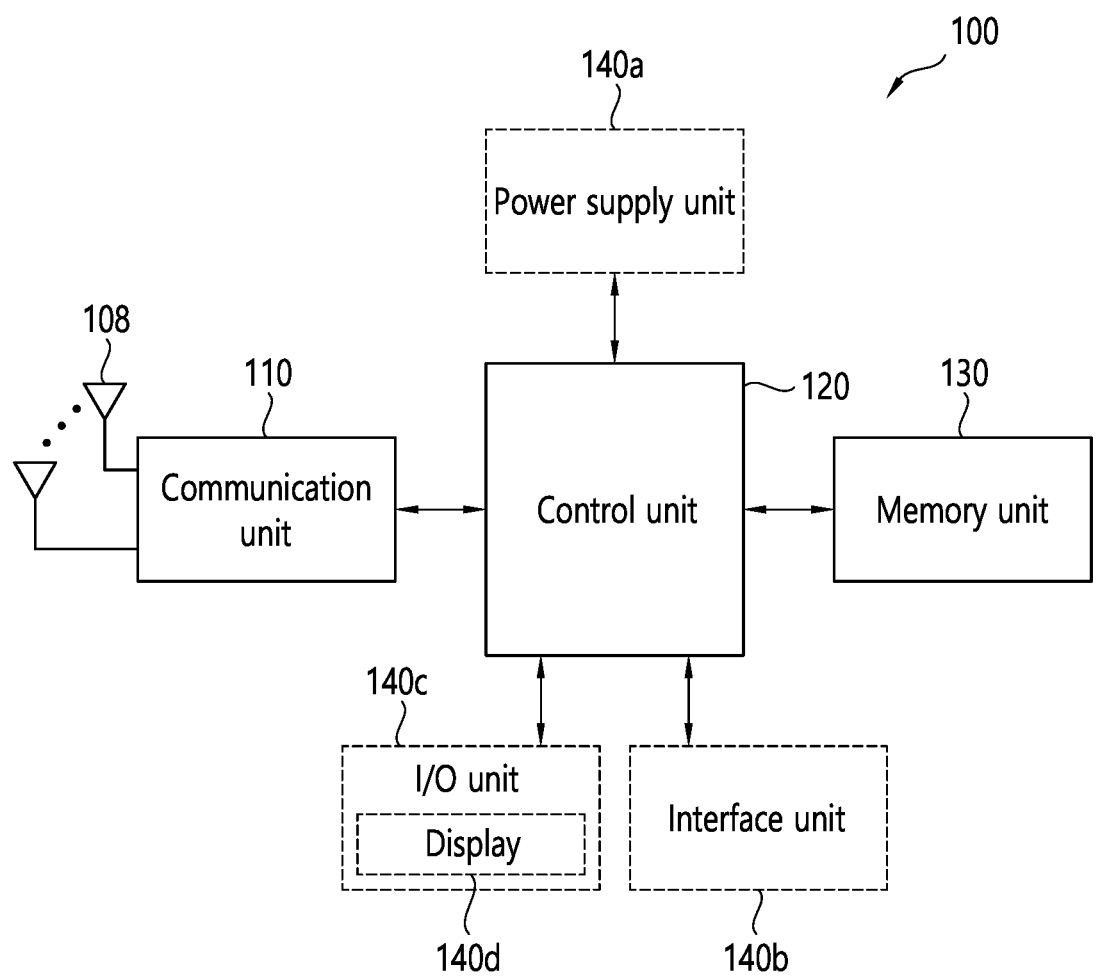
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
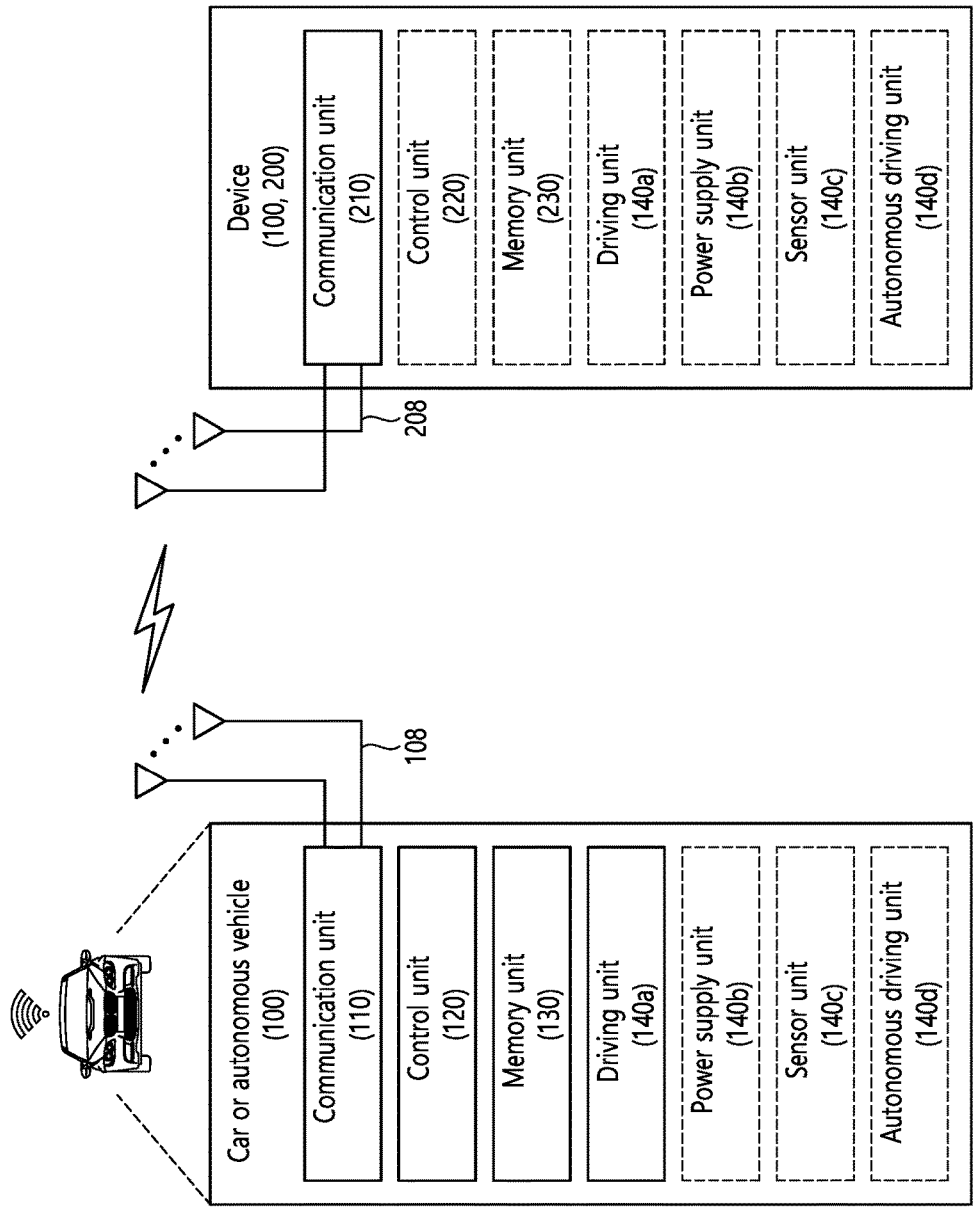
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a base station, the method comprising:

receiving, from a device, user equipment (UE) capability information of the device, wherein the UE capability information includes a first timing offset related to a minimum delay; and transmitting, to the device, a radio resource control (RRC) message related to the UE capability information, wherein the RRC message includes first timing offset candidate values related to Long Term Evolution (LTE) sidelink transmission, wherein the LTE sidelink transmission is performed based on the first timing offset candidate values which are configured by the RRC message.

2. The method of claim 1, further comprising:
transmitting, to the device, first NR downlink control information (DCI) for the LTE sidelink transmission,
wherein the first NR DCI includes information representing a second timing offset which is one of the first timing offset candidate values.

3. The method of claim 2, wherein the LTE sidelink transmission is performed based on the second timing offset among the first timing offset candidate values.

4. The method of claim 2, further comprising:
transmitting, to the device, second NR DCI for NR sidelink transmission,
wherein a size of the first NR DCI is less than or equal to a size of the second NR DCI.

5. The method of claim 2, further comprising:
transmitting, to the device, second NR DCI for NR sidelink transmission, wherein a size of the first NR DCI is greater than a size of the second NR DCI.

6. The method of claim 5, further comprising:
matching the size of the first NR DCI and the size of the second NR DCI by applying zero padding to the second NR DCI.

7. The method of claim 5, wherein a search space in which the first NR DCI is received does not overlap a search space in which the second NR DCI is received.

8. The method of claim 1,
wherein the first timing offset is one of second timing offset candidate values configurable by the base station to the device,
wherein the second timing offset candidate values include the first timing offset candidate values, and
wherein the first timing offset candidate values among the second timing offset candidate values are determined based on the first timing offset.

9. The method of claim 8, wherein a total number of the first timing offset candidate values is eight.

10. The method of claim 8, wherein the first timing offset candidate values include the first timing offset and timing offsets greater than the first timing offset among the second timing offset candidate values.

11. The method of claim 10, wherein the first timing offset candidate values include the first timing offset and values of integer multiples of the first timing offset among the second timing offset candidate values.

12. The method of claim 10, wherein the first timing offset candidate values include the first timing offset and timing offsets obtained by adding integer multiples of a slot duration to the first timing offset among the second timing offset candidate values.

13. The method of claim 10, wherein the first timing offset candidate values include the first timing offset and timing offsets obtained by adding integer multiples of a pre-configured time to the first timing offset among the second timing offset candidate values.

14. A base station adapted to perform wireless communication, the base station comprising:
at least one memory storing instructions;
at least one transceiver; and
at least one processor connected to the at least one memory and the at least one transceiver, wherein the at least one processor executes the instructions to:
control the at least one transceiver to receive, from a device, user equipment (UE) capability information of the device, wherein the UE capability information includes a first timing offset related to a minimum delay; and
control the at least one transceiver to transmit, to the device, a radio resource control (RRC) message related to the UE capability information, wherein the RRC message includes first timing offset candidate values related to Long Term Evolution (LTE) sidelink transmission,
wherein the LTE sidelink transmission is performed based on the first timing offset candidate values which are configured by the RRC message.

15. The base station of claim 14, wherein the at least one processor further executes the instructions to:
control the at least one transceiver to transmit, to the device, first NR downlink control information (DCI) for the LTE sidelink transmission, wherein the first NR DCI includes information representing a second timing offset which is one of the first timing offset candidate values.

16. The base station of claim 15, wherein the LTE sidelink transmission is performed based on the second timing offset among the first timing offset candidate values.

17. The base station of claim 14,
wherein the first timing offset is one of second timing offset candidate values configurable by the base station to the device,
wherein the second timing offset candidate values include the first timing offset candidate values, and
wherein the first timing offset candidate values among the second timing offset candidate values are determined based on the first timing offset.

18. The base station of claim 17, wherein a total number of the first timing offset candidate values is eight.

19. The base station of claim 17, wherein the first timing offset candidate values include the first timing offset and timing offsets greater than the first timing offset among the second timing offset candidate values.

20. An apparatus adapted to control a base station, the apparatus comprising:
at least one processor; and
at least one memory connected to the at least one processor and storing instructions, wherein the at least one processor executes the instructions to:
receive, from a device, UE capability information of the device, wherein the UE capability information includes a first timing offset related to a minimum delay; and
transmit, to the device, a radio resource control (RRC) message related to the UE capability information, wherein the RRC message includes first timing offset candidate values related to Long Term Evolution (LTE) sidelink transmission,
wherein the LTE sidelink transmission is performed based on the first timing offset candidate values which are configured by the RRC message.

* * * * *